(12) United States Patent
Coban et al.

(10) Patent No.: US 10,484,682 B2
(45) Date of Patent: Nov. 19, 2019

(54) REFERENCE PICTURE DERIVATION AND MOTION COMPENSATION FOR 360-DEGREE VIDEO CODING

(71) Applicant: QUALCOMM Incorporated, San Diego, CA (US)

(72) Inventors: Muhammed Zeyd Coban, Carlsbad, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/025,729

(22) Filed: Jul. 2, 2018

(65) Prior Publication Data

US 2019/0007679 A1   Jan. 3, 2019

Related U.S. Application Data

(60) Provisional application No. 62/528,347, filed on Jul. 3, 2017.

(51) Int. Cl.
| | |
|---|---|
| *H04N 19/115* | (2014.01) |
| *H04N 19/597* | (2014.01) |
| *H04N 19/186* | (2014.01) |
| *H04N 19/96* | (2014.01) |
| *H04N 19/176* | (2014.01) |
| *H04N 19/51* | (2014.01) |

(Continued)

(52) U.S. Cl.
CPC .......... *H04N 19/115* (2014.11); *G06T 15/205* (2013.01); *H04N 19/105* (2014.11); *H04N 19/117* (2014.11); *H04N 19/134* (2014.11); *H04N 19/176* (2014.11); *H04N 19/186* (2014.11); *H04N 19/51* (2014.11); *H04N 19/563* (2014.11); *H04N 19/597* (2014.11); *H04N 19/85* (2014.11); *H04N 19/88* (2014.11); *H04N 19/96* (2014.11)

(58) Field of Classification Search
CPC .. H04N 19/115; H04N 19/597; H04N 19/186; H04N 19/96; H04N 19/176; H04N 19/51; H04N 19/563; H04N 19/105; H04N 19/134; H04N 19/117; H04N 19/85; H04N 19/88; H04N 19/205
USPC .................................................... 375/240.25
See application file for complete search history.

(56) References Cited

U.S. PATENT DOCUMENTS

2018/0286109 A1* 10/2018 Woo ...................... G06T 15/205
2019/0166382 A1*  5/2019 He ........................ H04N 19/597

FOREIGN PATENT DOCUMENTS

CN         106254874 A      12/2016

OTHER PUBLICATIONS

Chen, J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

(Continued)

*Primary Examiner* — Dominic D Saltarelli
(74) *Attorney, Agent, or Firm* — Shumaker & Sieffert, P.A.

(57) ABSTRACT

This disclosure describes techniques for generating reference frames packed with extended faces from a cubemap projection or adjusted cubemap projection of 360-degree video data. The reference frames packed with the extended faces may be used for inter-prediction of subsequent frames of 360-degree video data.

30 Claims, 15 Drawing Sheets

(51) Int. Cl.
H04N 19/563 (2014.01)
H04N 19/105 (2014.01)
H04N 19/134 (2014.01)
H04N 19/117 (2014.01)
H04N 19/85 (2014.01)
H04N 19/88 (2014.01)
G06T 15/20 (2011.01)

(56) References Cited

OTHER PUBLICATIONS

ITU-T H.263, Series H: Audiovisual and Multimedia Systems, Infrastructure of audiovisual services—Coding of moving video, Video coding for low bit rate communication, The International Telecommunication Union, Jan. 2005, 226 pp.

ITU-T H.223, Series H: Audiovisual and Multimedia Systems, Infrastructure of Audiovisual Services—Transmission Multiplexing and Synchronization, Multiplexing protocol for low bit rate multimedia communication, The International Telecommunication Union, Jul. 2001, 74 pp.

Sauer, J., et al., "Geometry correction for motion compensation of planar-projected 360VR video," Joint Video Exploration Team (JVET) of ITU-T SG16 WP3 and ISO/IEC JTC1/SC29/WG11, 4th Meeting: Chengdu, CN, Oct. 15-21, 2016, JVET-D0067, 11 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Ma, X., et al., "Co-projection-plane based motion compensated prediction for cubic format VR content," Joint Video Exploration Team (JVET) of ITU-T SG16 WP3 and ISO/IEC JTC1/SC29/WG11, 4th Meeting: Chengdu, CN, Oct. 15-21, 2016, JVET-D0061, 4 pp.

International Search Report and Written Opinion of International Application No. PCT/US2018/040766, dated, Sep. 24, 2018, 18 pp.

He,Y., et al., "AHG8: Geometry padding for 360 video coding," Joint Video Exploration Team (JVET) of ITU-T SG16 WP3 and ISO/IEC JTC1/SC29/WG11, 4th Meeting: Chengdu, CN, Oct. 15-21, 2016, JVET-D0075, 10 pp.

He, Y., et al., "Geometry Padding for Motion Compensated Prediction in 360 Video Coding," 2017 Data Compression Conference, San Diego, CA, 2017, 1 p.

Coban, M., et al., "AHG8: Adjusted cubemap projection for 360-degree video," Joint Video Exploration Team (JVET) of ITU-T SG16 WP3 and ISO/IEC JTC1/SC29/WG11, 6th Meeting: Hobart, AU, Mar. 31-Apr. 7, 2017, JVET-F0025, 6 pp.

Budagavi, M., et al., "OMAF: Metadata for guard margin at polygon boundaries in 360 degrees video to prevent boundary artifacts," International Organisation for Standardisation, ISO/IEC JTC1/SC29/WG11 Coding of Moving Pictures and Audio, ISO/IEC/SC29/WG11 MPEG2016/m39280, Oct. 2016, Chengdu, China, 3 pp.

Youvalari, R., et al., "Efficient Coding of 360-Degree Pseudo-Cylindrical Panoramic Video for Virtual Reality Applications," 2016 IEEE International Symposium on Multimedia, Department of Signal Processing, Tampere University of Technology, Tampere, Finland, Dec. 2016, pp. 525-528.

Coban, M., et al., "AHG8: Reference picture extension of ACP format 360-degree video," Joint Video Exploration Team (JVET) of ITU-T SG16 WP3 and ISO/IEC JTC1/SC29/WG11, 7th Meeting: Torino, IT, Jul. 13-21, 2017, JVET-G0058, 4 pp.

He, Y., et al., "Motion Compensated Prediction with Geometry Padding for 360 Video Coding", InterDigital Communications, St. Petersburg, US, Dec. 10-13, 2017, 4 pp.

He, et al., "360Lib Software Manual," Joint Collaborative Team on Video coding (JCT-VC) of ITU-T SG16 WP3 and ISO/IEC JTC1/SC29/WG11, document: JVET-360Lib, Software Manual, Apr. 21, 2017, 24 pp.

Chen et al., "Description of SDR, HDR and 360 degree video coding technology proposal by Qualcomm and Technicolor-low and high complexity versions," JVET Meeting; San Diego, US, Apr. 10-20, 2018, (The Joint Video Exploration Team of ISO/IEC JTC1/SC29/WG11 and ITU-T SG.16); URL: http://phenix.int-evry.fr/JVET/, No. JVET-J0021, 43 pp.

Boyce, et al., "JVET common test conditions and evaluation procedures for 360° video," (The Joint Video Exploration Team of ISO/IEC JTC1/SC29/WG11 and ITU-T SG.16); JVET Meeting; 6th Meeting; Hobart, AU, Mar. 31-Apr. 7, 2017, No. JVET-F1030_v4, 7 pp.

Coban, et al., "AHG8: A study of 360Lib projections on global motion sequences," (The Joint Video Exploration Team of ISO/IEC JTC1/SC29/WG11 and ITU-T SG.16); JVET Meeting; 7th Meeting: Torino, IT, Jul. 13-21, 2017, No. JVET-G0100, 2 pp.

Segall A., et al., "Joint Call for Proposals on Video Compression with Capability Beyond HEVC," Joint Video Exploration Team (JVET) of ITU-T SG 16 WP 3 and ISO/IEC JTC 1/SC 29/WG 11, 8th Meeting: Macao, CN, Oct. 18-24, 2017, No. JVET-H1002, Oct. 23, 2017, 27 pp.

"CMake," accessed on Apr. 2, 2018, accessed from https://cmake.org/, 7 pp.

"ClangFormat," accessed on Apr. 2, 2018, accessed from https://clang.llvm.org/docs/ClangFormat.html , 4 pp.

* cited by examiner

REFERENCE PICTURE DERIVATION AND MOTION COMPENSATION FOR 360-DEGREE VIDEO CODING

This application claims the benefit of U.S. Provisional Application No. 62/528,347 filed Jul. 3, 2017, the entire content of which is incorporated by reference herein.

TECHNICAL FIELD

This disclosure relates to encoding and decoding video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, also referred to as High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

More recently, techniques for coding and transmitting 360-degree video, e.g., for virtual reality (VR) applications have been developed. As a result of recent developments in VR video technology, the video environment experienced by the user has become just as important as the subject of the videos themselves. Such VR video technology may use 360-degree video technology that involves real-time streaming of 360-degree video graphics and/or real-time streaming of 360-degree video from a 360-degree video camera or website to a real-time video display, such as a VR head-mount display (HMD). A VR HMD allows the user to experience action happening all around them by changing a viewing angle with a turn of the head. In order to create a 360-degree video, a special set of cameras may be used to record all 360-degrees of a scene simultaneously, or multiple views (e.g., video and/or computer-generated images) may be stitched together to form the image.

After video data has been encoded, the video data may be packetized for transmission or storage. The video data may be assembled into a video file conforming to any of a variety of standards, such as the International Organization for Standardization (ISO) base media file format and extensions thereof, such as the AVC file format.

SUMMARY

In general, this disclosure is directed to techniques for encoding and decoding video data. In some examples, this disclosure describes reference picture derivation and motion compensation techniques for 360-degree video coding. In some examples, this disclosure describes techniques for generating reference frames packed with extended faces from a cubemap projection or adjusted cubemap projection of 360-degree video data. The reference frames packed with the extended faces may be used for inter-prediction of subsequent frames of 360-degree video data. By generating reference frames with extended faces, distortion and coding efficiency issues resulting from deformation and discontinuities at the borders between packed faces may be mitigated.

In one example, this disclosure describes a method of decoding 360-degree video data, the method comprising receiving an encoded frame of 360-degree video data, the encoded frame of 360-degree video data being arranged in packed faces obtained from a projection of a sphere of the 360-degree video data, decoding the frame of encoded 360-degree video data to obtain a decoded frame of 360-degree video data, the decoded frame of 360-degree video data being arranged in the packed faces, deriving a decoded sphere of 360-degree video data from the decoded frame of 360-degree video data, sampling the decoded sphere of 360-degree video data to produce extended faces using the projection, wherein the extended faces are larger than the packed faces of the decoded frame of 360-degree video data, deriving an extended reference frame from the extended faces, and decoding a subsequent encoded frame of 360-degree video data using an inter-prediction process and the derived extended reference frame.

In another example, this disclosure describes an apparatus configured to decode 360-degree video data, the apparatus comprising a memory configured to store an encoded frame of 360-degree video data, and one or more processors in communication with the memory, the one or more processors configured to receive the encoded frame of 360-degree video data, the encoded frame of 360-degree video data being arranged in packed faces obtained from a projection of a sphere of the 360-degree video data, decode the frame of encoded 360-degree video data to obtain a decoded frame of 360-degree video data, the decoded frame of 360-degree video data being arranged in the packed faces, derive a decoded sphere of 360-degree video data from the decoded frame of 360-degree video data, sample the decoded sphere of 360-degree video data to produce extended faces using the projection, wherein the extended faces are larger than the packed faces of the decoded frame of 360-degree video data, derive an extended reference frame from the extended faces, and decode a subsequent encoded frame of 360-degree video data using an inter-prediction process and the derived extended reference frame.

In another example, this disclosure describes an apparatus configured to decode 360-degree video data, the apparatus comprising means for receiving an encoded frame of 360-degree video data, the encoded frame of 360-degree video data being arranged in packed faces obtained from a projection of a sphere of the 360-degree video data, means for decoding the frame of encoded 360-degree video data to obtain a decoded frame of 360-degree video data, the decoded frame of 360-degree video data being arranged in the packed faces, means for deriving a decoded sphere of 360-degree video data from the decoded frame of 360-degree video data, means for sampling the decoded sphere of 360-degree video data to produce extended faces using the projection, wherein the extended faces are larger than the packed faces of the decoded frame of 360-degree video data, means for deriving an extended reference frame from the extended faces, and means for decoding a subsequent encoded frame of 360-degree video data using an inter-prediction process and the derived extended reference frame.

In another example, this disclosure describes a computer-readable storage medium storing instructions that, when executed, causes one or more processors of a device configured to decode video data to receive the encoded frame of 360-degree video data, the encoded frame of 360-degree video data being arranged in packed faces obtained from a projection of a sphere of the 360-degree video data, decode the frame of encoded 360-degree video data to obtain a decoded frame of 360-degree video data, the decoded frame of 360-degree video data being arranged in the packed faces, derive a decoded sphere of 360-degree video data from the decoded frame of 360-degree video data, sample the decoded sphere of 360-degree video data to produce extended faces using the projection, wherein the extended faces are larger than the packed faces of the decoded frame of 360-degree video data, derive an extended reference frame from the extended faces, and decode a subsequent encoded frame of 360-degree video data using an inter-prediction process and the derived extended reference frame.

In another example, this disclosure describes a method of encoding 360-degree video data, the method comprising receiving a sphere of 360-degree video data, arranging the sphere of 360-degree video data into a frame of packed faces obtained from a projection of the sphere of 360-degree video data, encoding the frame of packed faces to form a frame of encoded 360-degree video data, reconstructing the frame of encoded 360-degree video data to obtain a reconstructed frame of 360-degree video data, the reconstructed frame of 360-degree video data being arranged in the packed faces, deriving a reconstructed sphere of 360-degree video data from the reconstructed frame of 360-degree video data, sampling the reconstructed sphere of 360-degree video data to produce extended faces using the projection, wherein the extended faces are larger than the packed faces of the reconstructed frame of 360-degree video data, deriving an extended reference frame from the extended faces, and encoding a subsequent frame of 360-degree video data using an inter-prediction process and the derived extended reference frame.

In another example, this disclosure describes an apparatus configured to encode 360-degree video data, the apparatus comprising a memory configured to store a sphere of 360-degree video data, and one or more processors in communication with the memory, the one or more processors configured to receive the sphere of 360-degree video data, arrange the sphere of 360-degree video data into a frame of packed faces obtained from a projection of the sphere of 360-degree video data, encode the frame of packed faces to form a frame of encoded 360-degree video data, reconstruct the frame of encoded 360-degree video data to obtain a reconstructed frame of 360-degree video data, the reconstructed frame of 360-degree video data being arranged in the packed faces, derive a reconstructed sphere of 360-degree video data from the reconstructed frame of 360-degree video data, sample the reconstructed sphere of 360-degree video data to produce extended faces using the projection, wherein the extended faces are larger than the packed faces of the reconstructed frame of 360-degree video data, derive an extended reference frame from the extended faces, and encode a subsequent frame of 360-degree video data using an inter-prediction process and the derived extended reference frame.

In another example, this disclosure describes an apparatus configured to encode 360-degree video data, the apparatus comprising means for receiving a sphere of 360-degree video data, means for arranging the sphere of 360-degree video data into a frame of packed faces obtained from a projection of the sphere of 360-degree video data, means for encoding the frame of packed faces to form a frame of encoded 360-degree video data, means for reconstructing the frame of encoded 360-degree video data to obtain a reconstructed frame of 360-degree video data, the reconstructed frame of 360-degree video data being arranged in the packed faces, means for deriving a reconstructed sphere of 360-degree video data from the reconstructed frame of 360-degree video data, means for sampling the reconstructed sphere of 360-degree video data to produce extended faces using the projection, wherein the extended faces are larger than the packed faces of the reconstructed frame of 360-degree video data, means for deriving an extended reference frame from the extended faces, and means for encoding a subsequent frame of 360-degree video data using an inter-prediction process and the derived extended reference frame.

In another example, this disclosure describes a computer-readable storage medium storing instructions that, when executed, causes one or more processors of a device configured to encode video data to receive a sphere of 360-degree video data, arrange the sphere of 360-degree video data into a frame of packed faces obtained from a projection of the sphere of 360-degree video data, encode the frame of packed faces to form a frame of encoded 360-degree video data, reconstruct the frame of encoded 360-degree video data to obtain a reconstructed frame of 360-degree video data, the reconstructed frame of 360-degree video data being arranged in the packed faces, derive a reconstructed sphere of 360-degree video data from the reconstructed frame of 360-degree video data, sample the reconstructed sphere of 360-degree video data to produce extended faces using the projection, wherein the extended faces are larger than the packed faces of the reconstructed frame of 360-degree video data, derive an extended reference frame from the extended faces, and encode a subsequent frame of 360-degree video data using an inter-prediction process and the derived extended reference frame.

The details of one or more examples are set forth in the accompanying drawings and the description below. Other features, objects, and advantages will be apparent from the description and drawings, and from the claims.

DETAILED DESCRIPTION

In general, this disclosure is directed to techniques for encoding and decoding video data. In some examples, this disclosure describes reference picture derivation and motion compensation techniques for 360-degree video coding. In some examples, this disclosure describes techniques of generating reference frames packed with extended faces from a cubemap projection or adjusted cubemap projection of 360-degree video data. The reference frames packed with the extended faces may be used for inter-prediction of subsequent frames of 360-degree video data. By generating reference frames with extended faces, distortion and coding efficiency issues resulting from deformation and discontinuities at the borders between packed faces may be mitigated.

Figure 1:
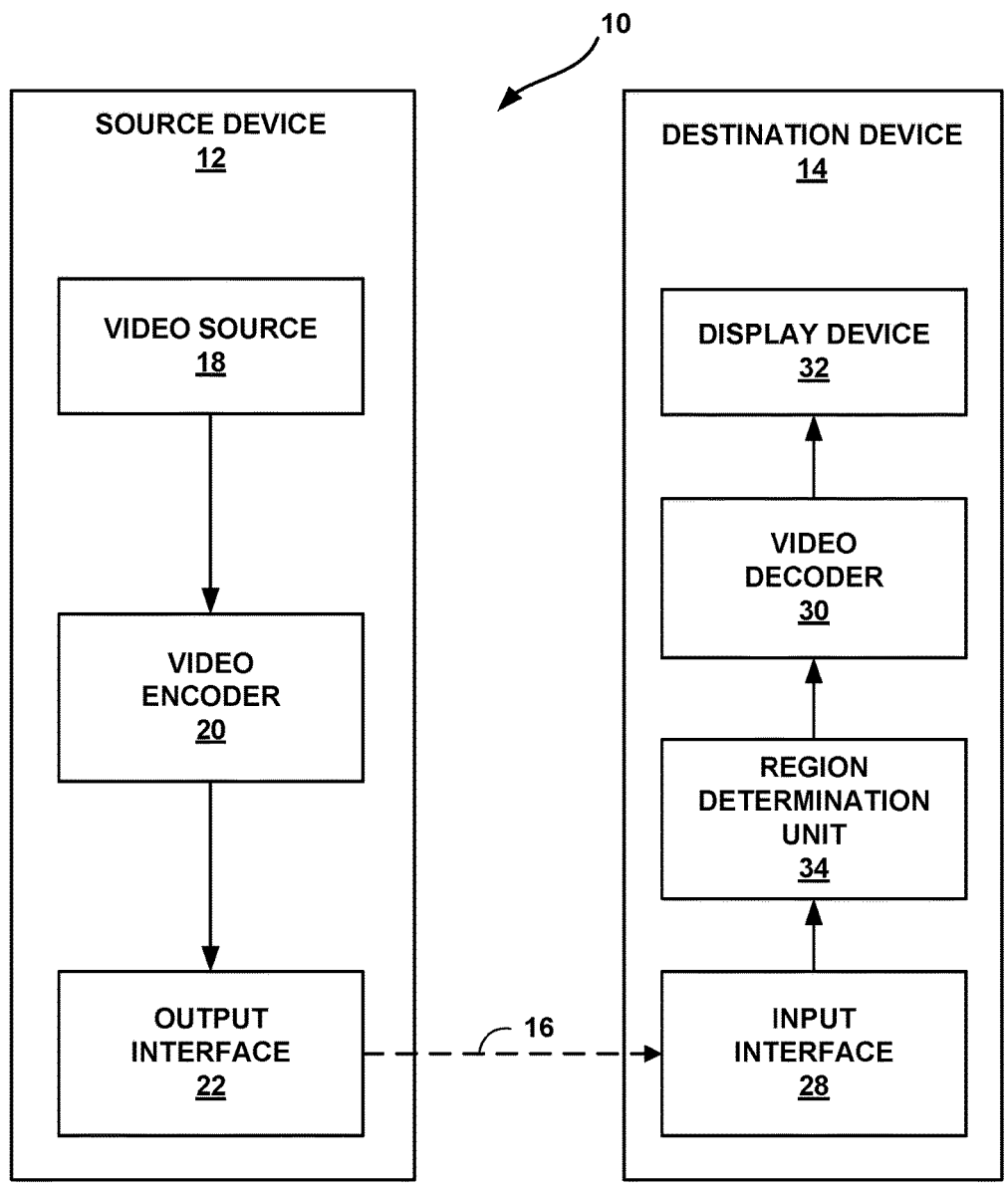
FIG. 1 is a block diagram illustrating an example video encoding and decoding system configured to perform the techniques of this disclosure.

FIG. 1 is a block diagram illustrating an example video encoding and decoding system 10 that may utilize techniques for reference picture derivation and motion compensation for 360-degree video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, display device 32, and region determination unit 34. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for reference picture derivation and motion compensation for 360-degree video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

In examples of this disclosure, video source 18 may be configured to capture 360-degree video data. For example, video source 18 may be a camera set, which typically consists of multiple individual cameras pointing to different directions and ideally collectively covering all viewpoints around the camera set. Video source 18 may be further configured to perform image stitching where video pictures taken by the multiple individual cameras are synchronized in the time domain and stitched in the space domain, to be a spherical video, but mapped to a rectangular format, such as an equi-rectangular map (like a world map) or cube map.

In one example, video encoder 20 may encode data for the full 360-degree panorama at multiple resolutions, e.g., 6 k, 4 k, HD (1080p), and 720p. That is, video encoder 20 may encode video data for each region (or "tile") at each of these multiple resolutions. In this manner, tile granularity may be the same for each resolution. Video encoder 20 may avoid inter-layer dependency when encoding the various resolutions. Thus, video decoder 30 may decode video data for the tiles at different resolutions in a selective manner (e.g., as selected by region determination unit 34). For example, region determination unit 34 may select a highest available resolution for regions at a center of the user's current viewpoint. Moving away from the center of the current viewpoint, the decoded resolution may drop gradually. That is, region determination unit 34 may select resolutions that get proportionally lower for regions (tiles) that are further from the center of the current viewpoint. Thus, video decoder 30 may decode video data at the lowest available resolution for tiles behind the user's current viewpoint.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In accordance with example techniques of this disclosure, output interface 22 and input interface 28 may correspond to network interfaces, such as network interface cards (NICs) implementing one or more network protocols, such as Ethernet. Computer-readable medium 16 may correspond to a network connection, which may traverse a private or public network, such as the Internet.

Display device 32 may correspond to a panoramic display. For example, display device 32 may correspond to a head-mounted display (HMD) or one or more screens that substantially or fully envelop a user. Region determination unit 34 may be configured to determine a plurality of regions of display device 32. For example, display device 32 may include a plurality of tiles, e.g., one or more portions of cube faces corresponding to a spherical display (or display that can simulate a spherical display, such as an HMD).

As discussed herein, region determination unit 34 may determine one or more of the regions at which a visual focus of the user (not shown in FIG. 1) is directed. Region determination unit 34 may cause input interface 28 to retrieve video data for a first subset of regions of display device 32 at which a visual focus of a user is directed.

Destination device 14 may include a memory configured to store retrieved video data, such as a hard disk and/or a buffer. Such memory may be included within video decoder 30, region determination unit 34, or elsewhere within destination device 14.

Video encoder 20 and video decoder 30 may operate according to a video coding standard, such as the High Efficiency Video Coding (HEVC) standard, also referred to as ITU-T H.265, or the new H.266 standard being studied by the Joint Video Experts Team (JVET). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP). In general, video decoder 30 performs a substantially similar, albeit reciprocal, process to that performed by video encoder 20 to decode encoded data.

Video encoder 20 and video decoder 30 each may be implemented as any of a variety of suitable encoder or decoder circuitry, e.g., including one or more processors, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Hence, an encoder or decoder may be formed by any of a variety of integrated processing circuitry comprising one or more processors implemented as fixed hardware processing circuitry, programmable processing circuitry and/or a combination of both fixed and programmable processing circuitry. Each of video encoder 20 and video decoder 30 may be included in one or more encoders or decoders, either of which may be integrated as part of a combined encoder/decoder (CODEC) in a respective device. A device including video encoder 20, video decoder 30, and/or region determination unit 34 may comprise an integrated circuit, a microprocessor, and/or a wireless communication device, such as a cellular telephone.

The following describes various video coding techniques with reference to the HEVC standard. However, the techniques of this disclosure may be used with any video coding techniques used with 360-degree video, including future video coding standards such as H.266.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC or other standards may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into 2 or 4 prediction units (PUs) or become just one PU when further partition does not apply. When two PUs are present in one CU, they can be half size rectangles or two rectangle size with ¼ or ¾ size of the CU.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra-prediction or inter-prediction to generate the predictive blocks for a PU. If video encoder 20 uses intra-prediction to generate the predictive blocks of a PU, video encoder 20 may generate the predictive blocks of the PU based on decoded samples of the picture associated with the PU. If video encoder 20 uses inter-prediction to generate the predictive blocks of a PU, video encoder 20 may generate the predictive blocks of the PU based on decoded samples of one or more pictures other than the picture associated with the PU. When the CU is inter coded, one set of motion information may be present for each PU. In addition, each PU may be coded with a unique inter-prediction mode to derive the set of motion information.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks.

A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RB SP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Figure 2A:
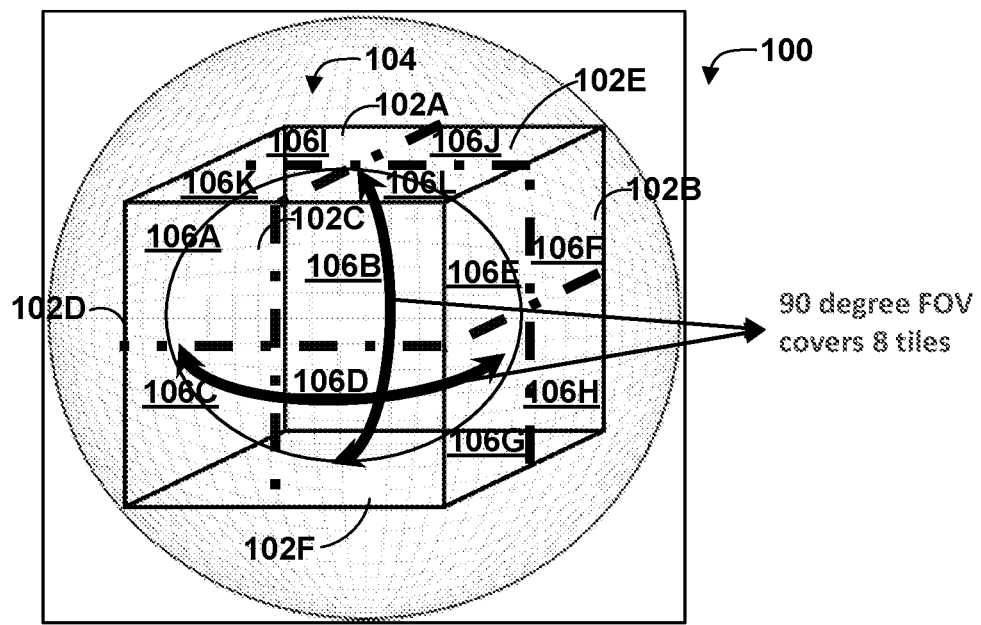
FIGS. 2A and 2B are conceptual diagrams illustrating representations of models for displays used to present 360-degree and/or panoramic video data.
Figure 2B:
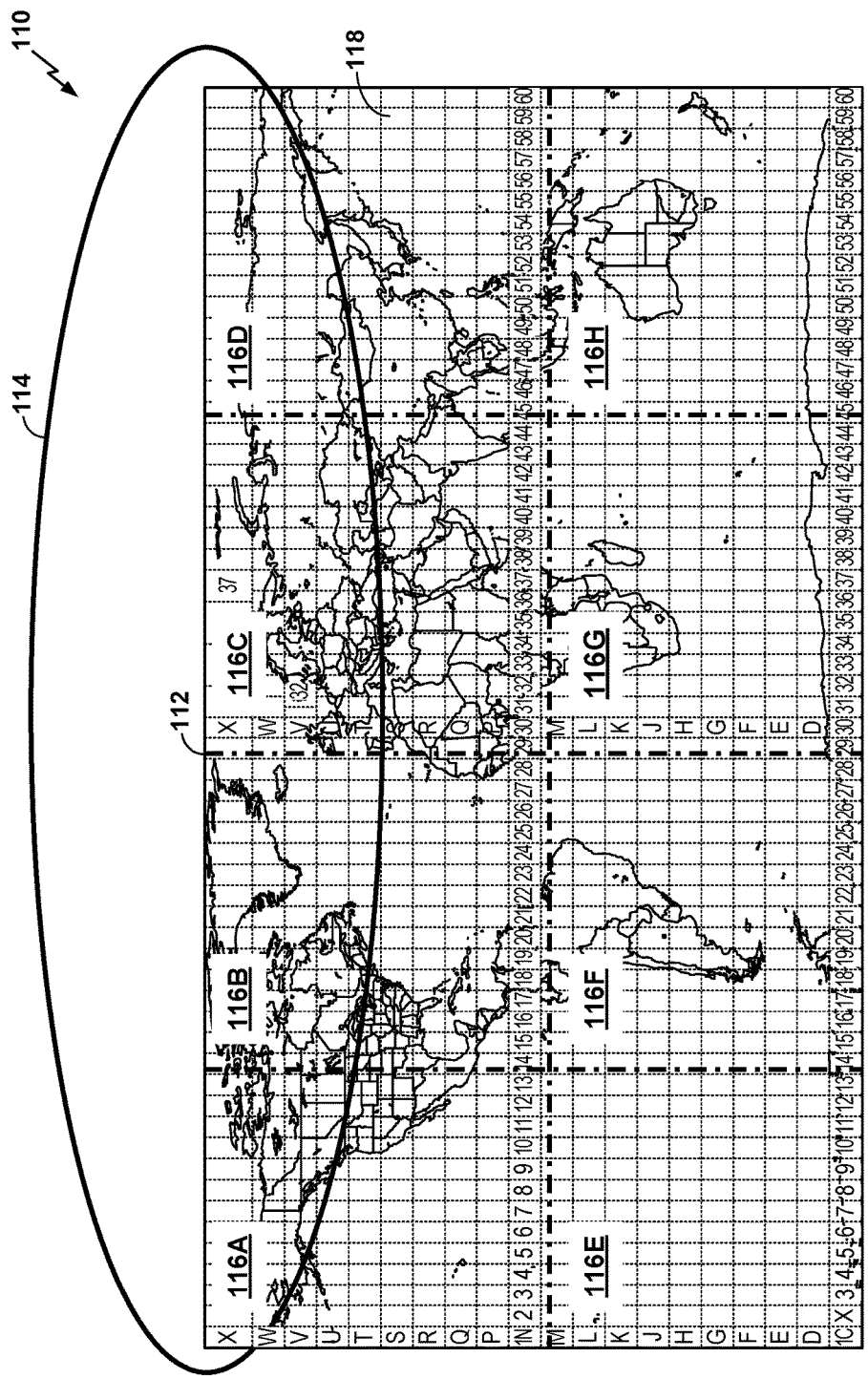

FIGS. 2A and 2B are conceptual diagrams illustrating representations of models for displays used to present panoramic and/or 360-degree video data. FIG. 2A illustrates an example of a cubemap projection 100, while FIG. 2B illustrates equi-rectangular projection 110.

In FIG. 2A, each of 6 faces 102A-102F (faces 102) of cube 104 is divided into four tiles (for a total of 24 tiles). However, in some examples, each of the faces may include only one tile. Tiles of visible faces (i.e., faces 102A, 102B, and 102C) are labeled as tiles 106A-106L. In particular, face 102C is divided into tiles 106A-106D, face 102B is divided into tiles 106E-106H, and face 102A is divided into tiles 106I-106L. The tiles of the hidden faces (i.e., faces 102D, 102E, and 102F) are unlabeled in FIG. 2A for purposes of readability, but it should be understood that faces 102D-102F are also divided into tiles. "Tiles" may also be referred to as regions. Each of cube faces 102 in FIG. 2A corresponds to a 90-degree by 90-degree field of view (FoV). Any arbitrary 90×90 degree tile of the sphere may require decoding of $\frac{1}{3}^{rd}$ of the panorama at high resolution. The FoV rarely spans more than eight tiles. Thus, the span of high resolution decoding can be restricted to eight tiles or less, without losing visual quality.

FIG. 2B illustrates canvas 118, which is divided into eight tiles 116A-116H. In this example, when a user is looking at the "poles" of the sphere (e.g., north pole 112, where the user's field of view when looking at north pole 112 is represented by area 114), the entire upper half of canvas 118 (i.e., tiles 116A-116D) would need to be decoded at high resolution. Breaking tiles 116A-116D up into more vertical tiles would not help to solve the problem. Thus, in this example, half of the panorama would need to be decoded at high resolution.

As discussed above, projections and mappings may be used to represent 3D surfaces on 2D maps. In 360-degree video applications, projections are used to map 360-degree video data represented on a sphere onto a two-dimensional video frame. Example projections include a cubemap projection and an adjusted cubemap projection (ACP). In general, video encoder 20 may use a cubemap projection and/or an ACP to map points on the surface of the sphere of 360-degree video to points onto planes (e.g., faces of a cube) that are tangential to the sphere surface, e.g., as shown in FIG. 2A. The resulting cube may be mapped to a 2D frame by packing the video data using various packing schemes. While this disclosure discuses projections of spherical 360-degree video onto six faces of a cube, it should be understood that the techniques of this disclosure may be used with other types of projections, including other cube-based projections as well as projections to other shapes.

In some examples of the disclosure, video encoder 20 may be configured to generate and signal one or more syntax elements in the encoded video bitstream that indicate the type of projection. Video decoder 30 may be configured to receive and parse the one or more syntax elements to determine the projection. In other examples, the projection to use may be predetermined and stored at both video encoder 20 and video decoder 30. As will be explained in more detail below, video decoder 30 may be configured to use the same projection as video encoder 20 to generate a reference frame having extended faces (e.g., faces that are larger than the faces generated by video encoder 20). The extended faces may have more samples than the originally sampled faces.

Figure 3:
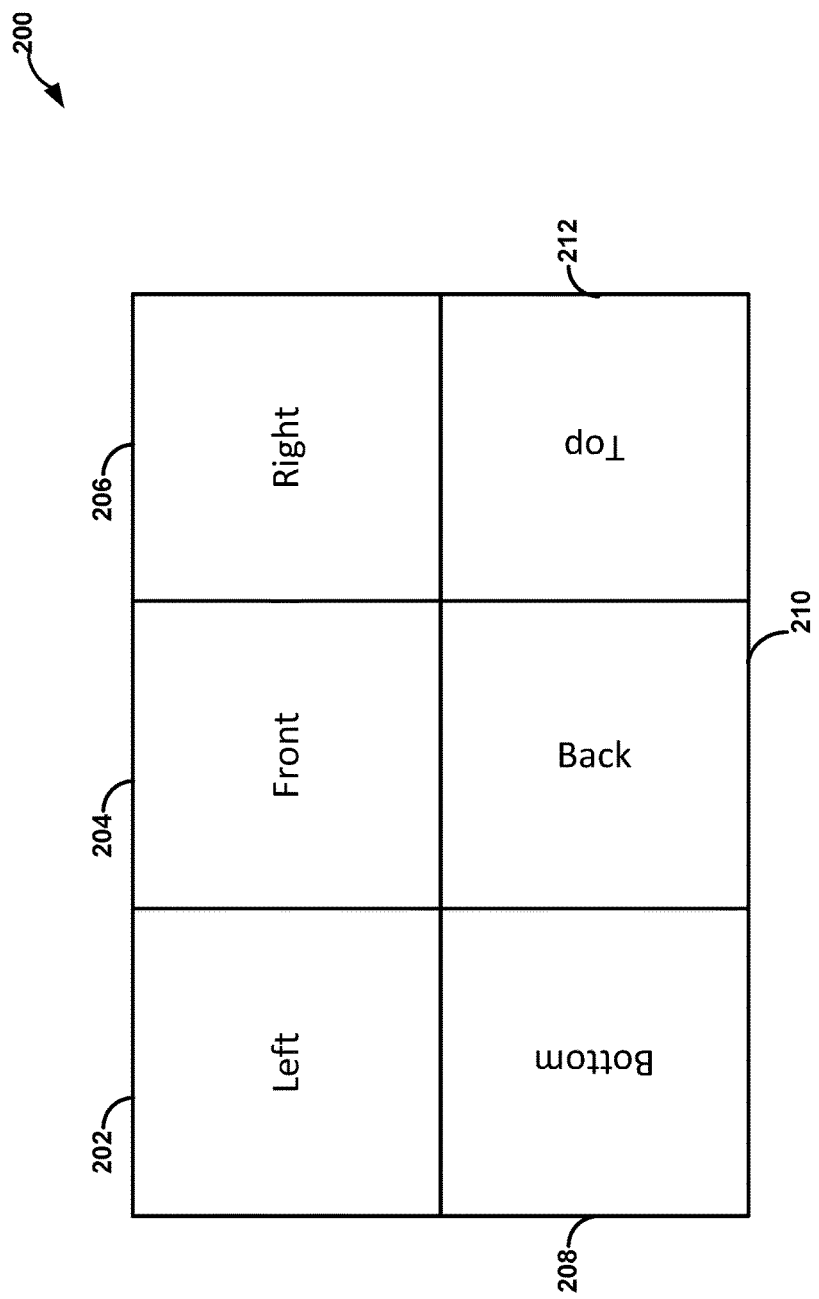
FIG. 3 is a conceptual diagram illustrating an example 3×2 packing structure for 360-degree video.

FIG. 3 illustrates an example of 3×2 frame packing that video encoder 20 and video decoder 30 may use to pack a cubemap projection and/or an ACP. As shown in FIG. 3, six faces of a cubemap projection or ACP (or other projection types) for a frame of 360-degree video data may be packed into frame 200. Frame 200 is a data structure and may be considered analogous to a frame or a picture of 360-degree video data, and may be treated similarly to a frame or picture of 2D video data (e.g., an HEVC picture). However, frame 200 includes video data from each of the six faces of a projection of 360-degre video data onto a cube (e.g., a cubemap projection or ACP).

As shown in FIG. 3, the video data for the left cube face 202 is packed in the upper left corner of frame 200, the video data for the front cube face 204 is packed in the upper middle of frame 200, the video data for the right cube face 206 is packed in the upper right corner of frame 200, the video data for the bottom cube face 208 is packed in the lower left corner of frame 200, the video data for the back cube face 210 is packed in the lower middle of frame 200, and the top cube face 212 is packed in the lower right corner of the frame 200. As shown in FIG. 3, the arrangement of the text of the left, front, right, bottom, back and top cube faces also indicates the orientation of the video data within frame 200. It should be understood that the 3×2 packing arrangement of frame 200 is just an example, and other orders and orientations of cube faces may be used.

In some examples of the disclosure, video encoder 20 may be configured to generate and signal one or more syntax elements in the encoded video bitstream that indicate the packing scheme used to pack a cubemap projection and/or an ACP projection into frame 200. Video decoder 30 may be configured to receive and parse the one or more syntax elements to determine the packing scheme. In other examples, the packing scheme to use may be predetermined and stored at both video encoder 20 and video decoder 30. As will be explained in more detail below, video decoder 30 may be configured to use the same packing scheme as video encoder 20 to generate a reference frame having extended faces (e.g., faces that are larger than the faces generated by video encoder 20). The extended faces may have more samples than the originally sampled faces.

When generating and packing a cubemap projection and/or an ACP, there may be discontinuities or deformations along the edges of each cube face. Deformations arise from the projection technique used, while the discontinuities may be the result of the packing scheme. Due to the projection techniques used, deformations can often occur at the certain cube face boundaries (e.g., deformation between left and front cube faces or between front and right cube faces).

The top row of three cube faces are continuous, representing left, front and right faces. Similarly, the bottom row of three cube faces represents top, back, and bottom cube faces. However, the bottom row is rotated by 90 degrees. As such, there may be discontinuities along the borders of cube faces. For example, the video data at the bottom of front cube face 204 may not flow directly to the top edge of back cube face 210, even though they are adjacent. This is because the top edge of back cube face 210 is in actuality the left edge of the video data of back cube face 210, given the 90 degree clockwise rotation of back cube face 210 in the packing scheme shown in FIG. 3.

These kinds of deformations and discontinuities along the cube faces may lower coding efficiency and/or increase distortion when performing inter-prediction during video coding. An object crossing a cube face over a time duration may not be efficiently predicted due to discontinuities and deformations.

Figure 4:
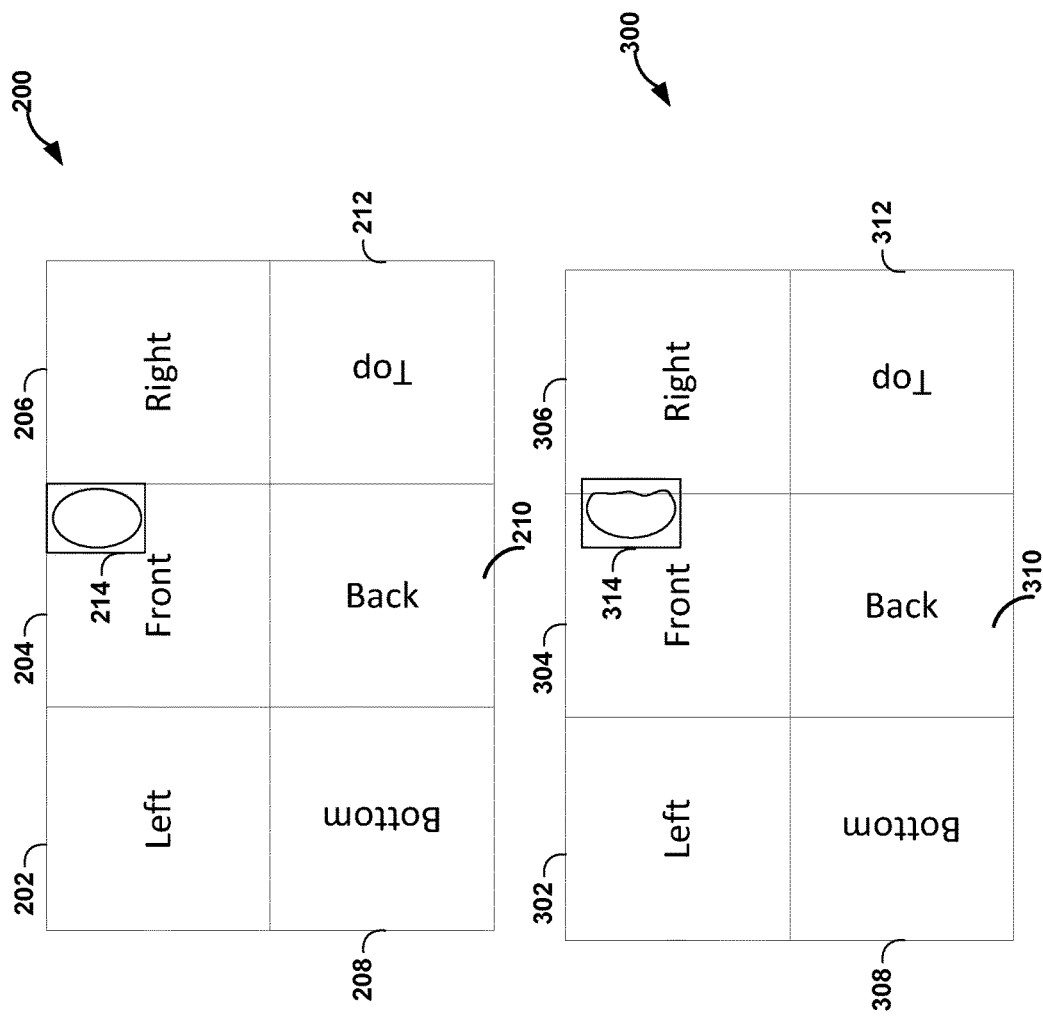
FIG. 4 is a conceptual diagram illustrating deformations at cube face boundaries.

FIG. 4 shows an example that may cause possible inter-prediction inefficiencies due to deformations at cube face boundaries. As shown in FIG. 4, frame 200 includes left face 202, front face 204, right face 206, bottom face 208, back face 210, and top face 212. Frame 200 is packed in the same manner as described above with reference to FIG. 3. Video encoder 20 may be generated the faces of frame 200 using any projection techniques, including a cubemap projection or an ACP. In the example of FIG. 4, video encoder 20 and/or video decoder 30 may be configured to perform inter-prediction on block 214. For illustrative purposes, FIG. 4 shows block 214 as including an elliptical object. This elliptical object is meant to represent any portion of the image represented in the 360-degree video data.

Reference frame 300 is a frame of packed 360-degree video data that has been previously reconstructed and/or decoded by video encoder 20 or video decoder 30. Reference frame 300 may be stored in a decoded picture buffer. Reference frame 300 includes left face 302, front face 304, right face 306, bottom face 308, back face 310, and top face 312. Reference frame 300 may be packed in the same manner as frame 200 and the faces of reference frame 300 may be generated using the same projection techniques as frame 200.

As shown in FIG. 4, reference frame 300 may include reference block 314 that corresponds to block 214 in frame 200. Video encoder 20 may locate reference block 314 using a motion estimation process. Video encoder 20 may indicate the location of reference block 314 to video decoder 30. As shown in FIG. 4, reference block 314 crosses the boundary of front face 304 and right face 306. Due to deformation resulting from the projection process, the portion of the elliptical object in reference block 314 that is along the edge of front face 304 and right face 306 is deformed relative to the elliptical object in block 214 of frame 200. As such, predicting block 214 from reference block 314 may result in distortion and/or loss of coding efficiency.

Figure 5:
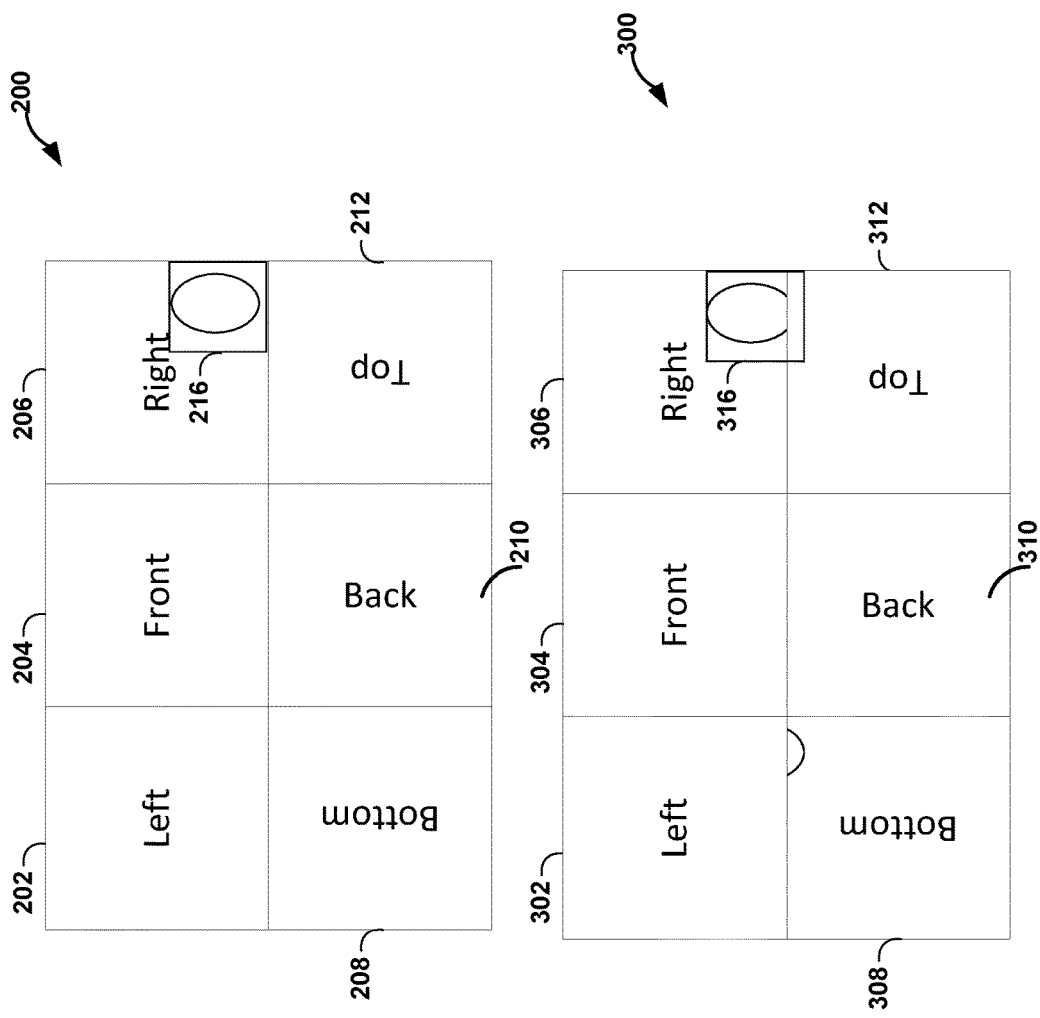
FIG. 5 is a conceptual diagram illustrating discontinuities at cube face boundaries.

FIG. 5 shows an example that may cause possible inter-prediction inefficiencies due to discontinuities at cube face boundaries. As shown in FIG. 5, frame 200 includes left face 202, front face 204, right face 206, bottom face 208, back face 210, and top face 212. Frame 200 is packed in the same manner as described above with FIG. 3. Video encoder 20 may generate the faces of frame 200 using any projection techniques, including a cubemap projection or an ACP. In the example of FIG. 5, video encoder 20 and/or video decoder 30 may be configured to perform inter-prediction on block 216. For illustrative purposes, FIG. 5 shows block 216 as including an elliptical object. This elliptical object is meant to represent any portion of the image represented in the 360-degree video data.

Reference frame 300 is a frame of packed 360-degree video data that has been previously reconstructed and/or decoded by video encoder 20 or video decoder 30. Reference frame 300 may be stored in a decoded picture buffer. Reference frame 300 includes left face 302, front face 304, right face 306, bottom face 308, back face 310, and top face 312. Reference frame 300 may be packed in the same manner as frame 200 and the faces of reference frame 300 may be generated using the same projection techniques as frame 200.

As shown in FIG. 5, reference frame 300 may include reference block 316 that corresponds to block 216 in frame 200. Video encoder 20 may locate reference block 316 using a motion estimation process. Video encoder 20 may indicate the location of reference block 316 to video decoder 30. As shown in FIG. 5, reference block 316 crosses the boundary of right face 306 and top face 306. Due to discontinuities between faces resulting from the packing scheme, the portion of the elliptical object in reference block 314 that is over the edge of top face 212 is, in actuality, located in bottom face 308. As such, predicting block 216 from reference block 316 may result in distortion and/or loss of coding efficiency, as the entirety of the elliptical object is not located in reference block 316.

One technique that addresses the preservation of the neighborhood information (i.e., portions of an image that are near or across face boundaries), as well as reducing potential deformation, involves projecting objects from a neighboring cube face plane to the plane where the current block to be coded resides as extensions to the current coded block's face plane. Examples of such techniques are described in J. Sauer, M. Wien, "Geometry correction for motion compensation of planar-projected 360VR video" JVET-D0067, 2016, and X. Ma, H. Yang, Z. Zhao, L. Li, H. Li, "Co-projection-plane based motion compensated prediction for cubic format VR content," JVET-D0061, 2016. An example of such techniques is also illustrated in FIG. 6.

Figure 6:
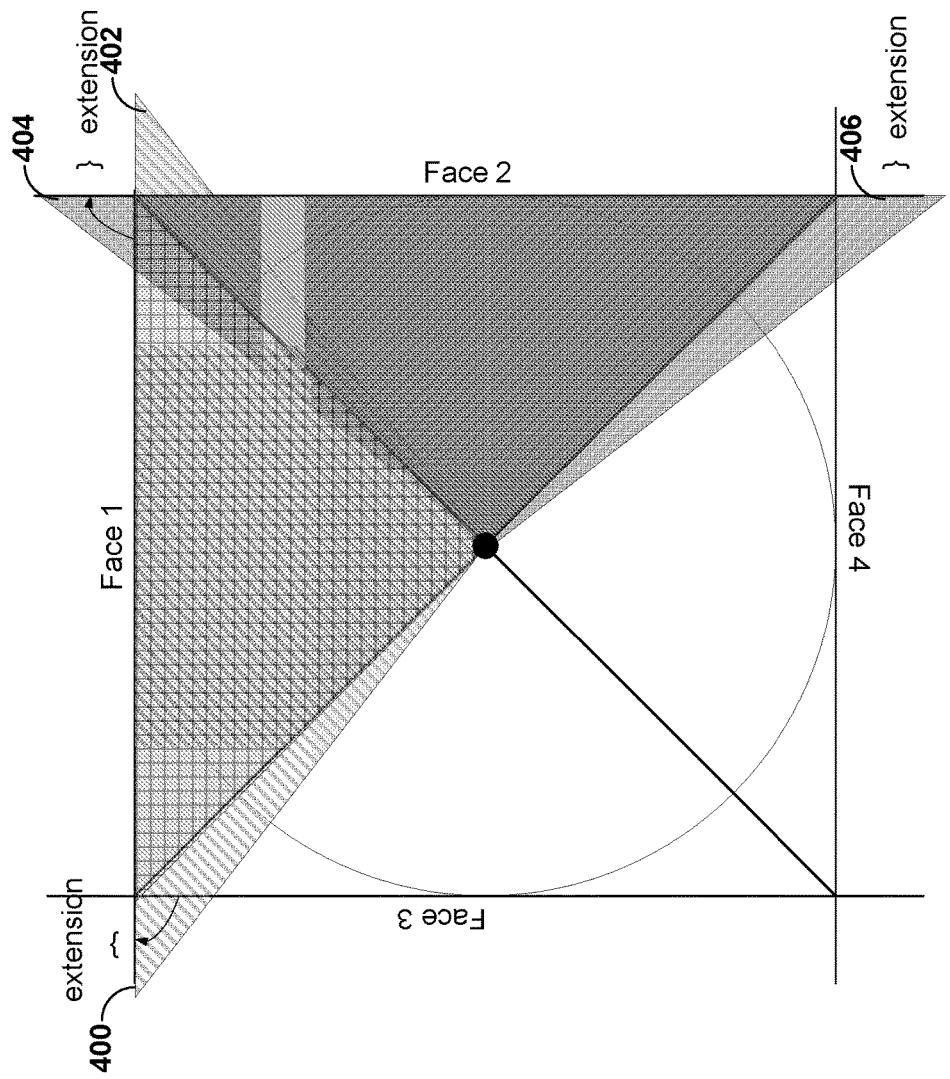
FIG. 6 is a conceptual diagram illustrating a process for cube face extension.

As shown in FIG. 6, video encoder 20 and/or video decoder 30 may extend the video data represented in face 1 with a wider projection (shown as extension 400 and extension 402). Extension 400 may include portions of the video data that may be in face 3, while extension 402 may include portions of the video data that may be in face 2. Likewise, video encoder 20 and/or video decoder 30 may extend the video data represented in face 2 with a wider projection (shown as extension 404 and extension 406). Extension 404 may include portions of the video data that may be in face 1, while extension 406 may include portions of the video data that may be in face 4. As such, the resulting extensions to the borders of cube faces include pixels from cube faces that neighbor a particular cube face. Video encoder 20 and/or video decoder 30 may use an ACP to derive the extended samples for video data originally projected with an ACP, and may use a cubemap projection to derive the extended samples for video data originally projected with a regular cubemap projection.

To address the shortcomings of coding of cubemap and ACP projections using inter-prediction, this disclosure describes techniques that include extending the faces of a decoded packed cubemap frame or ACP frames and forming a reference frame from packing the extended faces. In this way, objects in the video data that are near the borders of faces will more likely be within the same face of the reference frame having the extended face. As such, the issues described above resulting from deformations and discontinuities along the face boundaries may be reduced.

The techniques of this disclosure may be performed by both video encoder 20 and video decoder 30. For example, after encoding a frame of video data, video encoder 20 may be configured to reconstruct (e.g., decode) the encoded frame of video data and store the encoded frame of video data as a reference frame in a decoded picture buffer. Using the techniques of this disclosure, video encoder 20 may be configured to process the reconstructed frame of video data to create extended faces and pack and store the extended faces in a decoded picture buffer as an extended face reference frame. Likewise, using the techniques of this disclosure, video decoder 30 may be configured to process a decoded frame of video data to create extended faces and pack and store the extended faces in a decoded picture buffer as an extended face reference frame. Video decoder 30 may use the same process as video encoder 20 to create the extended faces reference frame. Video encoder 20 and video decoder 30 may then use the extended faces reference frame as references for inter-prediction. The following techniques will be described with reference to video decoder 30. However, it should be understood that the same techniques may be performed by video encoder 20 in the reconstruction loop when forming reference pictures.

In one example of the disclosure, video decoder 30 may be configured to receive an encoded frame of 360-degree video data in an encoded video bitstream. The encoded frame of 360-degree video data may be arranged in packed faces obtained from a projection of a sphere of the 360-degree video data (e.g., a cubemap projection or an ACP). For example, the encoded frame of 360-degree video data may be packed as shown in FIG. 3. Of course, other packing arrangements may be used. Video decoder 30 may be further configured to decode the frame of encoded 360-degree video data to obtain a decoded frame of 360-degree video data, the decoded frame of 360-degree video data being arranged in the same arrangement of packed faces.

In accordance with the techniques of this disclosure, video decoder 30 may be configured to process the decoded frame of 360-degree video data to generate a reference frame of 360-degree video data having extended cube faces. Video decoder 30 may be configured to extend the cube faces by sampling a sphere of 360-degree video data that is derived from the decoded frame of 360-degree video data, e.g., as shown in FIG. 5. That is, depending on the projection used, video decoder 30 may derive a decoded sphere of 360-degree video data from the decoded frame of 360-degree video data. As discussed above, the projection used may be predetermined and stored at both video encoder 20 and video decoder 30 and/or video encoder 20 may signal the projection used to video decoder 30.

Video decoder 30 may then sample the decoded sphere of 360-degree video data back into extended faces using the projection used by video encoder 20 (e.g., a cubemap projection, ACP, or other projection as described about with reference to FIG. 2A and FIG. 2B). However, unlike the projection used to create the encoded frame of 360-degree video data, video decoder 30 may sample the decoded sphere of 360-degree video to produce extended faces that are larger than the packed faces of the decoded frame of 360-degree video data. That is the extended faces include a border of extension pixels around the originally received and decoded cube faces. Video decoder 30 may then derive an extended reference frame from the extended faces by packing the extended faces into a reference frame using a packing scheme. The packing scheme may be the same packing scheme used for the encoded frame of 360-degree video data. Again, the packing scheme used may be predetermined and stored at both video encoder 20 and video decoder 30 and/or video encoder 20 may signal the packing scheme used to video decoder 30.

The derivation of the extension pixels may be normative since the extension pixels will be used for prediction of following frames. Approximations to the floating-point projection of the extended pixels may be specified in some examples. In some examples, the amount of extension (e.g., in terms of numbers of pixels) may be configurable. For example, video encoder 20 may generate and signal syntax at a picture and/or sequence level in a parameter set that indicates how many pixels larger to make the extended cube faces relative to the original cube faces. In other examples, the number of extension pixels may be predetermined and stored at both video encoder 20 and video decoder 30. In one example, the number of extension pixels may be the largest prediction unit size of a given CTU size.

Figure 7:
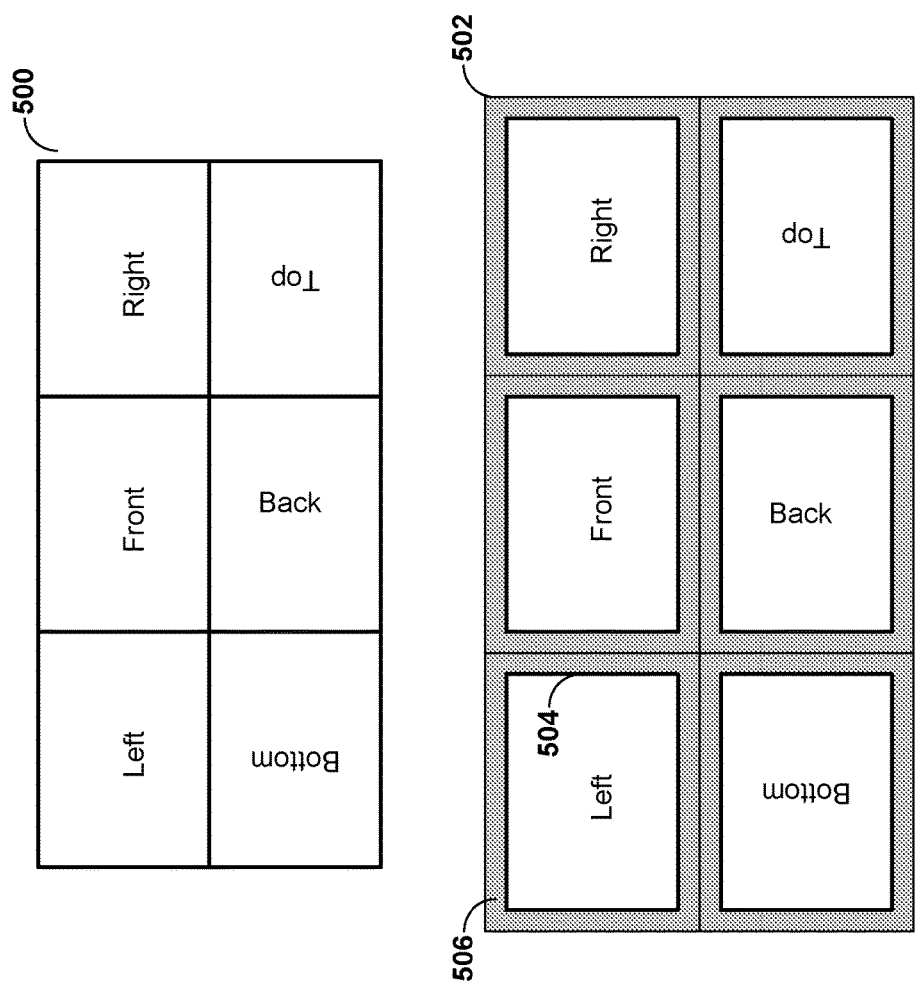
FIG. 7 is a conceptual diagram illustrating a reconstructed adjusted cubemap projection (ACP) frame and an extended reference frame.

FIG. 7 shows a decoded/reconstructed packed frame 500 and the extended reference frame 502 that is derived from the reconstructed packed frame 500. As can be seen in FIG. 7, each of the cube faces of extended reference frame 502 are larger than the cube faces of decoded/reconstructed packed frame 500. The cube faces of extended reference frame 502 include all of the video data of the cube faces of decoded/reconstructed packed frame 500 (e.g., the white portion 504 of the left cube face), in addition to a number of extension pixels surrounding the cube faces (e.g., the gray portion 506 of the left cube face). Accordingly, each of the cube faces in extended reference frame 502 include more neighboring pixels relative to the original borders between the cube faces of decoded/reconstructed packed frame 500. Accordingly, when using reconstructed packed frame 500 as a reference for inter-prediction, fewer pixels will be subject to the deformations and discontinuities caused by the projection process.

Figure 8:
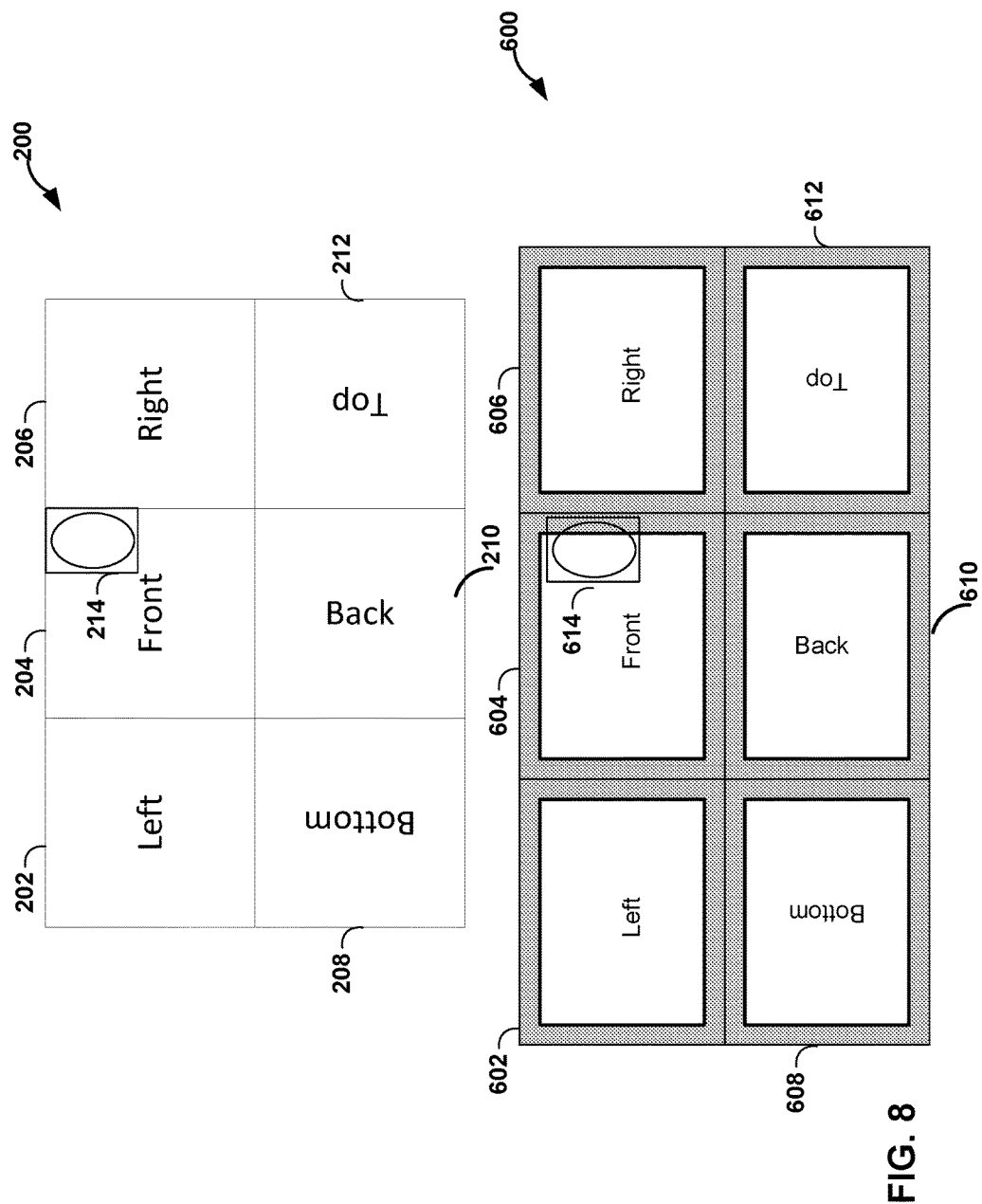
FIG. 8 is a conceptual diagram illustrating a derived extended reference frame that may improve inter-prediction at deformation cube face boundaries.

Video decoder 30 may then use the extended reference frame 502 to decode a subsequently received encoded frame of 360-degree video data using an inter-prediction process. FIG. 8 is a conceptual diagram illustrating a derived extended reference frame that may improve inter-prediction at deformation cube face boundaries. Compare FIG. 8 to the deformations shown in FIG. 4. Frame 200 of FIG. 8 is the same as frame 200 in FIG. 4. Instead of producing reference frame 300, as shown in FIG. 4, video encoder 20 and video decoder 30 may be configured to generate extended reference frame 600 shown in FIG. 8. Video encoder 20 and video decoder 30 may generate extended reference frame 600 using the techniques described above.

Extended reference frame 600 includes extended left face 602, extended front face 604, extended right face 606, extended bottom face 608, extended back face 610, and extended top face 612. As shown in FIG. 8, extended reference frame 308 may include reference block 614 that corresponds to block 214 in frame 200. Video encoder 20 may locate reference block 614 using a motion estimation process. Video encoder 20 may indicate the location of reference block 614 to video decoder 30. As shown in FIG. 4, reference block 314 crosses the boundary of front face 304 and right face 306, causing inter-prediction errors due to deformations. However, as shown in FIG. 8, reference block 614 is completely within extended front face 604. As such, any deformations that may have been present in reference frame 300 of FIG. 4 are mitigated due to the extended reference faces produced when generating extended reference frame 600.

Figure 9:
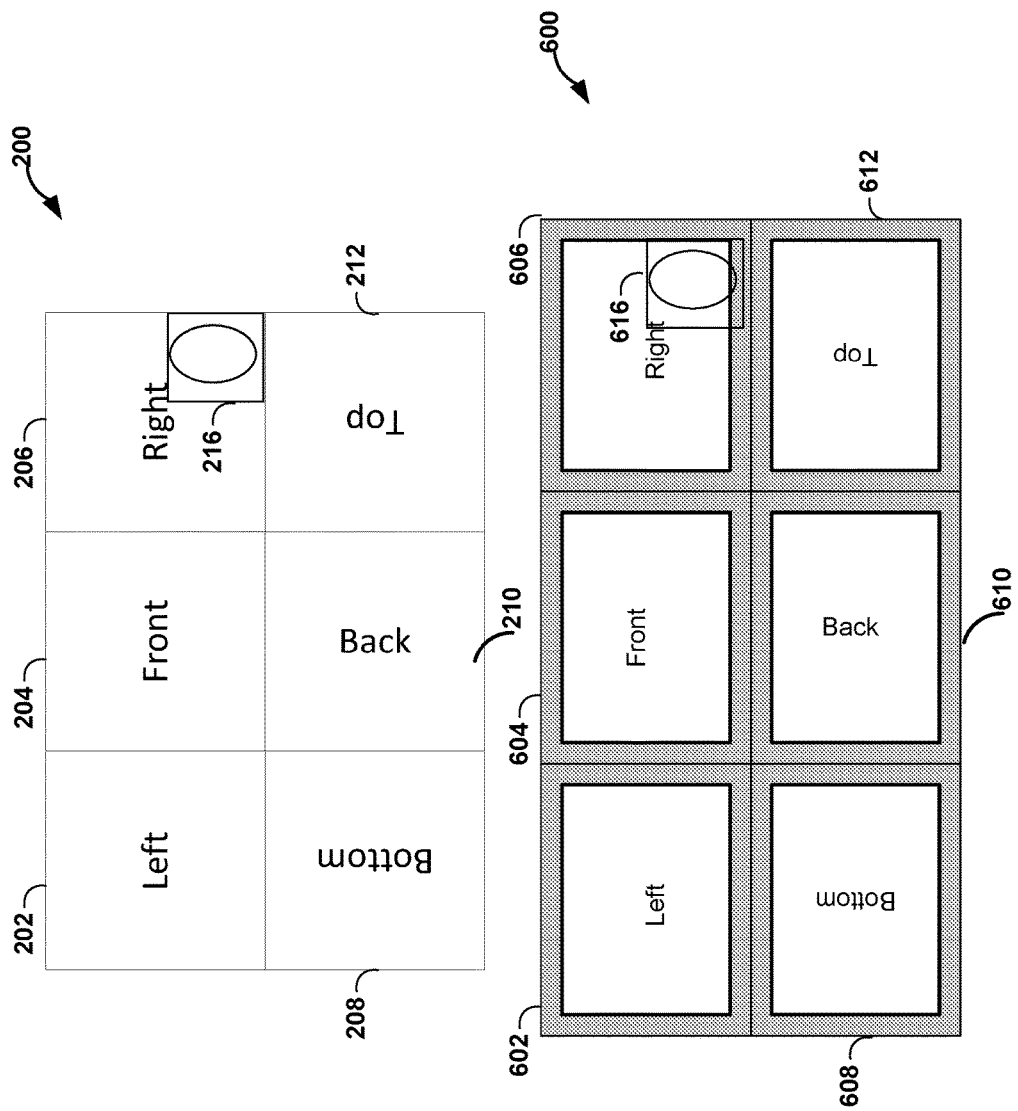
FIG. 9 is a conceptual diagram illustrating a derived extended reference frame that may improve inter-prediction at discontinuity cube face boundaries.

FIG. 9 is a conceptual diagram illustrating a derived extended reference frame that may improve inter-prediction at discontinuity cube face boundaries. Compare FIG. 9 to the discontinuities shown in FIG. 5. Frame 200 of FIG. 9 is the same as frame 200 in FIG. 5. Instead of producing reference frame 300, as shown in FIG. 5, video encoder 20 and video decoder 30 may be configured to generate extended reference frame 600 shown in FIG. 9. Video encoder 20 and video decoder 30 may generate extended reference frame 600 using the techniques described above.

Extended reference frame 600 includes extended left face 602, extended front face 604, extended right face 606, extended bottom face 608, extended back face 610, and extended top face 612. As shown in FIG. 9, extended reference frame 600 may include reference block 616 that corresponds to block 216 in frame 200. Video encoder 20 may locate reference block 616 using a motion estimation process. Video encoder 20 may indicate the location of reference block 616 to video decoder 30. As shown in FIG. 5, reference block 316 crosses the boundary of right face 306 and top face 308, causing inter-prediction errors due to discontinuities. However, as shown in FIG. 9, reference block 616 is completely within extended right face 606. As such, any discontinuities that may have been present in reference frame 300 of FIG. 5 are mitigated due to the extended reference faces produced when generating extended reference frame 600.

As discussed above, the extended reference frame generated using the techniques of this disclosure is larger than the decoded frame (e.g., includes more pixels). The collocated pixels of the currently decoded frame on the reference frame correspond to locations of the pixels in the non-extension regions (faces) in the extended frame (e.g., white region 504 of FIG. 7), i.e., all zero-motion vector prediction would be the reference frame pre-extension, i.e., prior to the extension being applied. The extension handles the deformation and the discontinuities at the border regions. However, in some packing schemes, the cube faces on the top row and bottom row are rotated by 90 degrees. This may prevent efficient prediction from bottom to top, or vice versa, in circumstances of large motion that moves objects well across cube face boundaries.

In order to address motion compensation from rotated faces, video encoder 20 and video decoder 30 may be configured to rotate the block (e.g., prediction unit) of a currently coded block to align the orientation of the current block and its prediction block (e.g., a reference block or prediction block in a rotated cube face of a reference frame). Video encoder 20 and video decoder 30 may be configured to determine whether or not to rotate the current block (or rotate the reference block) by determining the face orientation at the location of the top left corner of the prediction block pointed to by the motion vector with respect to the coded block's face orientation.

Figure 10:
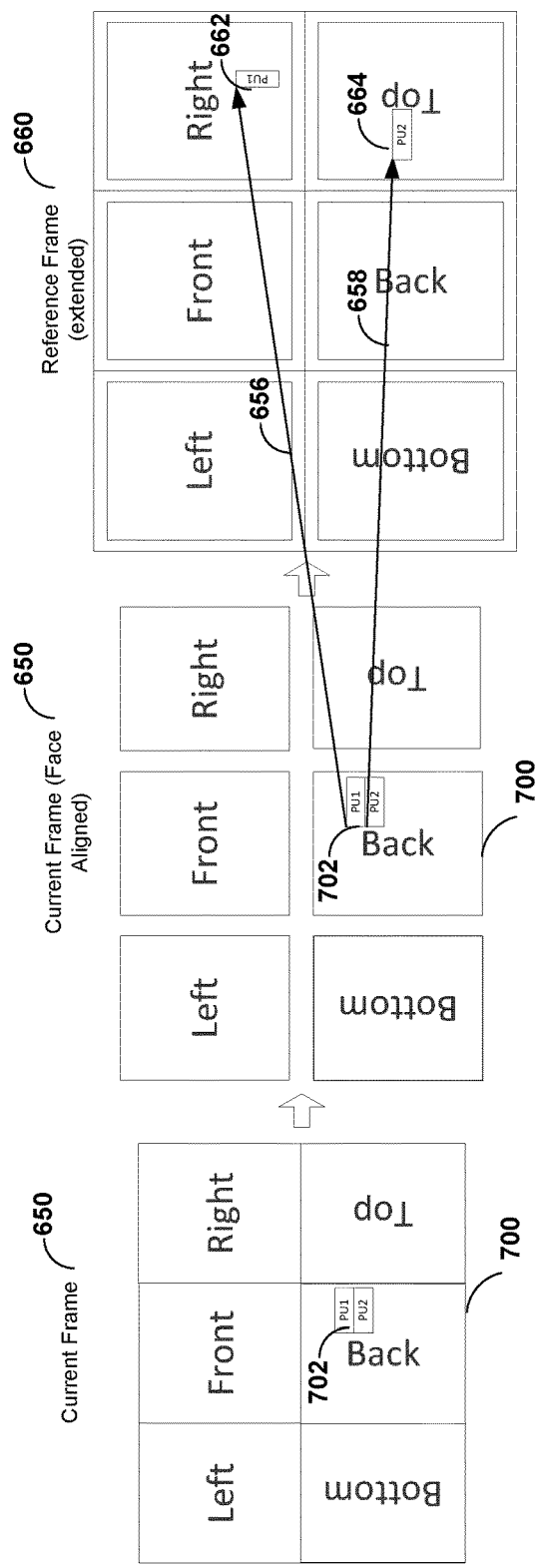
FIG. 10 is a conceptual diagram showing example prediction unit rotation according to one example of the disclosure.

FIG. 10 shows an example where a current block 702, having PU1 and PU2, is located in back face 700 of current frame 650 is being predicted from PUs from the right face and the top face. As shown in FIG. 10, the motion vector (MV) 656 for the upper PU (PU1) of block 702 points to PU1 662 in the right face of reference frame 660 and the MV 658 for the lower PU (PU2) of block 702 points to the PU2 664 in the top face of reference frame 660. In some examples, the faces of reference frame 660 may be extended using the techniques described above, such as is shown in FIG. 10. However, in other examples, the reference frame need not have extended faces.

As shown in FIG. 10, given the packing scheme used, the right face of both current frame 650 and reference frame 660 is rotated 90-degrees counter clockwise with respect to the back faces of current frame 650 and reference frame 660. As such, in accordance with techniques of this disclosure, video encoder 20 and video decoder 30 may be configured to rotate the PUs in the current frame relative to the orientation of the reference blocks in the reference frame so as to match the orientation of the current block with reference block. In the example of FIG. 10, video encoder 20 and video decoder 30 may be configured to rotate PU1 of block 702 by 90 degrees counter clockwise to match reference block 662. Video encoder 20 and video decoder 30 may be configured to rotate PU2 of block 702 by 90 degrees clockwise to match reference block 664.

Furthermore, after prediction, video encoder 20 and video decoder 30 may rotate the residual samples back to the orientation of the back face of current frame 650 to form the final prediction block. For coded blocks located in bottom and top faces predicted from left, front or right faces, the PU's would be rotated 90 degrees clockwise to align the objects in the faces. A similar scheme may be applied for the case where blocks in the left, front, and right faces are predicted from blocks from bottom, back, and top faces to align the face orientation. No rotation may be applied for prediction between faces that are not rotated with respect to each other. As one example, no rotation may be applied for prediction between left, front, and right faces. As another example, no rotation may be applied for predictions between bottom, back and top faces. Table 1 below provides a summary of example rotations applied to prediction blocks for all faces.

For packing schemes that use different cube face orientation, a similar scheme that aligns the orientation of cube faces is applied. The packing schemes of the packed frames may be signaled in parameter sets. The block prediction rotation can also be applied to non-cube based projections, e.g., rotated spherical projection (RSP), where, in packing, some regions are rotated with respect to another region. In Table 1, CW refers to clock-wise rotation and CCW refers to counter clock-wise rotation.

TABLE 1

Prediction block rotations across faces.

| Coded Face | Block Rotation with respect to the coded face orientation Reference face | | | | | |
|---|---|---|---|---|---|---|
| | Front | Left | Right | Top | Back | Bottom |
| Front | 0 | 0 | 0 | 90 CCW | 90 CW | 90 CCW |
| Left | 0 | 0 | 0 | 0 | 90 CW | 180 |
| Right | 0 | 0 | 0 | 180 | 90 CW | 0 |
| Top | 90 CW | 0 | 180 | 0 | 0 | 0 |
| Back | 90 CCW | 90 CCW | 90 CCW | 0 | 0 | 0 |
| Bottom | 90 CW | 180 | 0 | 0 | 0 | 0 |

Figure 11:
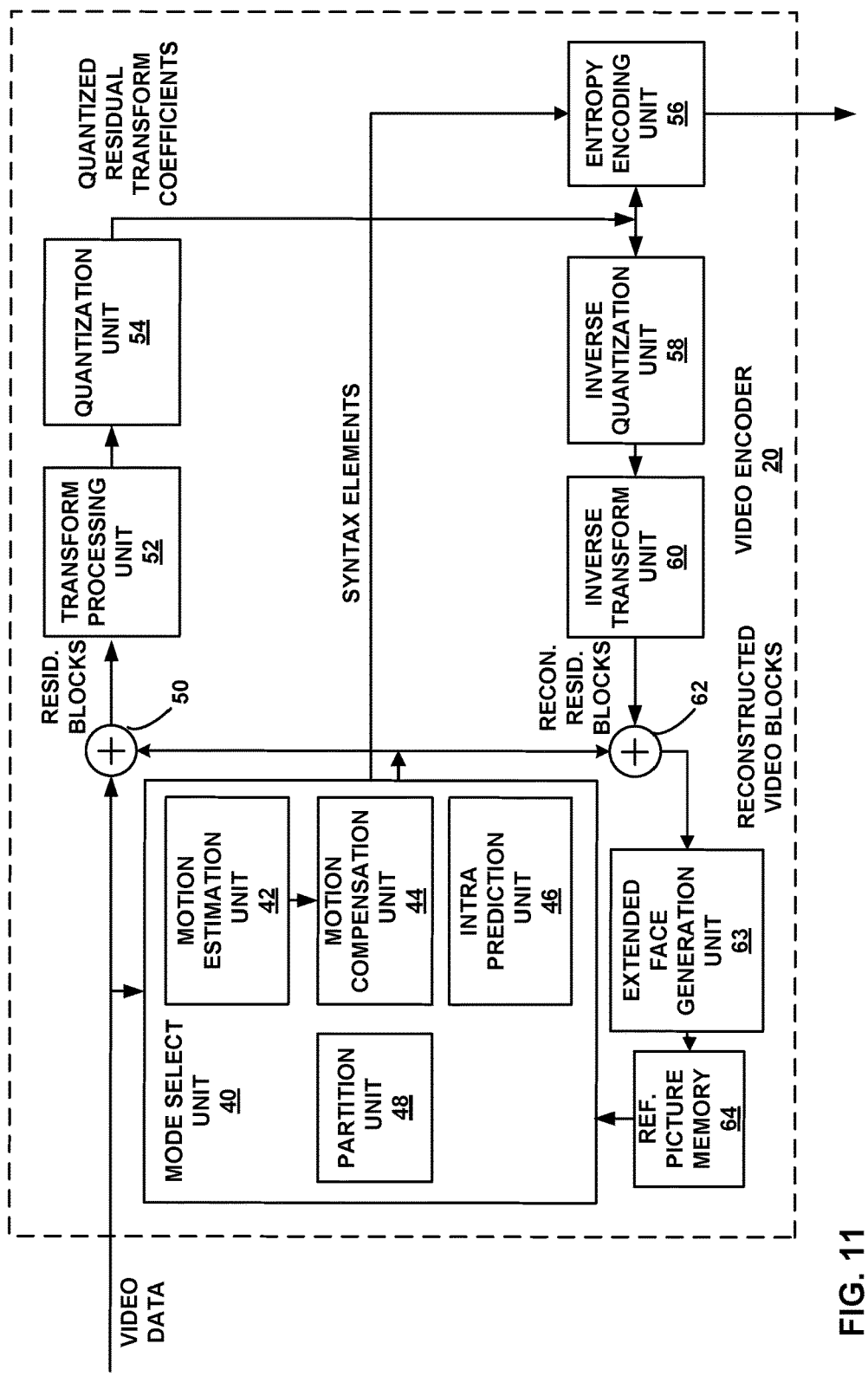
FIG. 11 is a block diagram illustrating an example video encoder configured to perform the techniques of this disclosure.

FIG. 11 is a block diagram illustrating an example of video encoder 20 that may implement techniques of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 11, video encoder 20 receives a current frame of video data to be encoded. In examples of this disclosure, the video frame may be a frame of 360-degree video data. The frame of 360-degree video data may be packed cube faces formed from a cubemap projection or ACP of a sphere of 360-degree video data.

In the example of FIG. 11, video encoder 20 includes mode select unit 40, reference picture memory 64 (which may also be referred to as a decoded picture buffer (DPB)), summer 50, transform processing unit 52, quantization unit 54, extended face generation unit 63, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 11) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 62 (as an in-loop filter).

During the encoding process, video encoder 20 receives a video frame or slice to be coded. The frame or slice may be divided into multiple video blocks. Motion estimation unit 42 and motion compensation unit 44 perform inter-predictive encoding of the received video block relative to one or more blocks in one or more reference frames to provide temporal prediction. Intra-prediction unit 46 may alternatively intra-predict the received video block using pixels of one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the prediction modes, intra or inter, e.g., based on error results, and provides the resulting predicted block to summer 50 to generate residual data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Furthermore, motion compensation unit 44 may be configured to perform any or all of the techniques of this disclosure (alone or in any combination). Although discussed with respect to motion compensation unit 44, it should be understood that mode select unit 40, motion estimation unit 42, partition unit 48, and/or entropy encoding unit 56 may also be configured to perform certain techniques of this disclosure, alone or in combination with motion compensation unit 44.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising transform coefficient values. Wavelet transforms, integer transforms, sub-band transforms, discrete sine transforms (DSTs), or other types of transforms could be used instead of a DCT. In any case, transform processing unit 52 applies the transform to the residual block, producing a block of transform coefficients. The transform may convert the residual information from a pixel domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain. In particular, summer 62 adds the reconstructed residual block to the motion compensated prediction block earlier produced by motion compensation unit 44 or intra-prediction unit 46 to produce a reconstructed video block for storage in reference picture memory 64. The reconstructed video block may be used by motion estimation unit 42 and motion compensation unit 44 as a reference block to inter-code a block in a subsequent video frame.

In accordance with the techniques of this disclosure, extended face generation unit 63 may form an extended reference frame from the reconstructed video blocks using the techniques described above. For example, using the techniques described above, video encoder 20 may receive and encode frame of 360-degree video data. An encoded frame of 360-degree video may be arranged in packed faces obtained from a projection of a sphere of the 360-degree video data. Video encoder 20 may reconstruct the frame of encoded 360-degree video data to obtain a reconstructed frame of 360-degree video data. The reconstructed frame of 360-degree video data is also arranged in the packed faces. Extended face generation unit 63 may be configured to derive a decoded sphere of 360-degree video data from the reconstructed frame of 360-degree video data. Extended face generation unit 63 may further be configured to sample the decoded sphere of 360-degree video data to produce extended faces using the projection (e.g., cubemap projection or ACP). The extended faces are larger than the packed faces of the reconstructed frame of 360-degree video data. Extended face generation unit 63 may be configured to derive an extended reference frame from the extended faces and store the extended reference frame in reference picture memory 64. Video encoder 20 may then encode a subsequent frame of 360-degree video data using an inter-prediction process and the derived extended reference frame.

Figure 12:
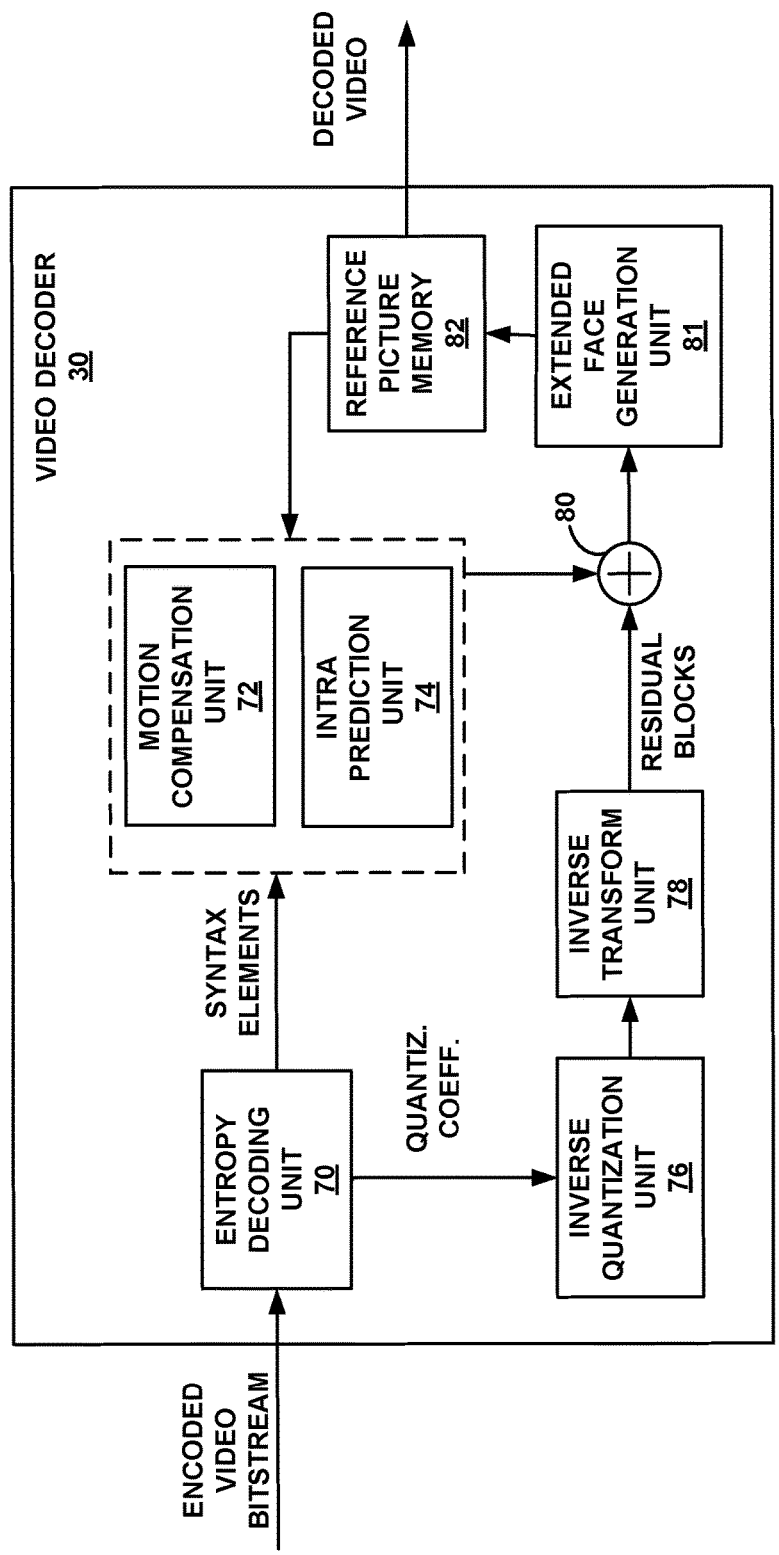
FIG. 12 is a block diagram illustrating an example video decoder configured to perform the techniques of this disclosure.

FIG. 12 is a block diagram illustrating an example of video decoder 30 that may implement techniques of this disclosure. In the example of FIG. 12, video decoder 30 includes an entropy decoding unit 70, motion compensation unit 72, intra-prediction unit 74, inverse quantization unit 76, inverse transformation unit 78, reference picture memory 82, extended face generation unit 81 and summer 80. Video decoder 30 may, in some examples, perform a decoding pass generally reciprocal to the encoding pass described with respect to video encoder 20 (FIG. 11). Motion compensation unit 72 may generate prediction data based on motion vectors received from entropy decoding unit 70, while intra-prediction unit 74 may generate prediction data based on intra-prediction mode indicators received from entropy decoding unit 70.

As shown in FIG. 12, video decoder receives an encoded video bitstream including a current encoded frame of video data to be decoded. In examples of this disclosure, the encoded video frame may be an encoded frame of 360-degree video data. The encoded frame of 360-degree video data may be packed cube faces formed from a cubemap projection or ACP of a sphere of 360-degree video data.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B or P) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters for sub-pixel precision. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks. Furthermore, motion compensation unit 72 may be configured to perform any or all of the techniques of this disclosure (alone or in any combination).

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1. For example, reference picture memory 82 may store decoded pictures.

In accordance with the techniques of this disclosure, extended face generation unit 81 may form an extended reference frame from the decoded video blocks of a video frame using the techniques described above. For example, using the techniques described above, video decoder 30 may receive an encoded frame of 360-degree video data. The encoded frame of 360-degree video may be arranged in packed faces obtained from a projection of a sphere of the 360-degree video data. Video decoder 30 may decode the frame of encoded 360-degree video data to obtain a decoded frame of 360-degree video data. The decoded frame of 360-degree video data is also arranged in the packed faces. Extended face generation unit 81 may be configured to derive a decoded sphere of 360-degree video data from the decoded frame of 360-degree video data. Extended face generation unit 81 may further be configured to sample the decoded sphere of 360-degree video data to produce extended faces using the projection (e.g., cubemap projection or ACP). The extended faces are larger than the packed faces of the decoded frame of 360-degree video data. Extended face generation unit 81 may be configured to derive an extended reference frame from the extended faces and store the extended reference frame in reference picture memory 82. Video decoder 30 may then decode a subsequent encoded frame of 360-degree video data using an inter-prediction process and the derived extended reference frame.

Figure 13:
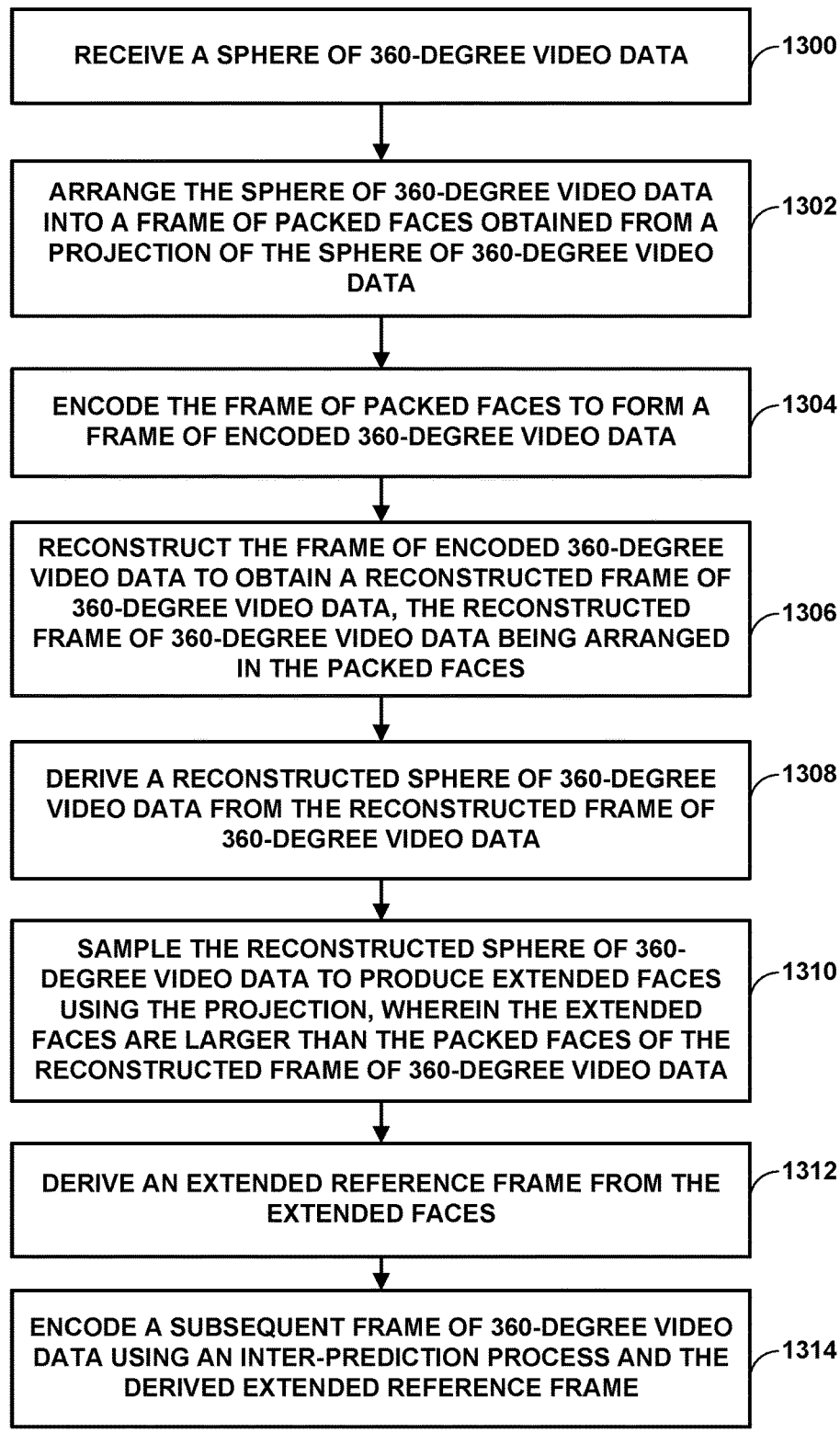
FIG. 13 is a flowchart illustrating an example encoding method of the disclosure.

FIG. 13 is a flowchart illustrating an example encoding method of the disclosure. Video encoder 20, including extended face generation unit 63, may be configured to perform the techniques of FIG. 13.

In one example of the disclosure, video encoder 20 may be configured to receive the sphere of 360-degree video data (1300), and arrange the sphere of 360-degree video data into a frame of packed faces obtained from a projection of the sphere of 360-degree video data (1302). Video encoder 20 may be further configured to encode the frame of packed faces to form a frame of encoded 360-degree video data (1304), and then reconstruct the frame of encoded 360-degree video data to obtain a reconstructed frame of 360-degree video data, the reconstructed frame of 360-degree video data being arranged in the packed faces (1306). Video encoder 20 may be further configured to derive a reconstructed sphere of 360-degree video data from the reconstructed frame of 360-degree video data (1308), and sample the reconstructed sphere of 360-degree video data to produce extended faces using the projection, wherein the extended faces are larger than the packed faces of the reconstructed frame of 360-degree video data (1310). Video encoder 20 may be further configured to derive an extended reference frame from the extended faces (1312), and encode a subsequent frame of 360-degree video data using an inter-prediction process and the derived extended reference frame (1314).

In one example of the disclosure, the projection is a cubemap projection or an adjusted cubemap projections (ACP).

In another example of the disclosure, to sample the reconstructed sphere of 360-degree video data to produce extended faces using the projection, video encoder 20 may be further configured to sample the reconstructed sphere of 360-degree video data to produce extended faces using the projection in accordance with a number of extension pixels.

In another example of the disclosure, video encoder 20 is further configured to generate an indication of the number of extension pixels at a picture level or a sequence level. In one example, the number of extension pixels is equal to a largest prediction unit size in a coding tree unit (CTU) of the encoded frame of packed faces.

In another example of the disclosure, video encoder 20 is further configured to rotate a current prediction unit in a current cube face of the encoded frame of packed faces based on a rotation angle of a reference cube face containing a reference block for the current prediction unit.

Figure 14:
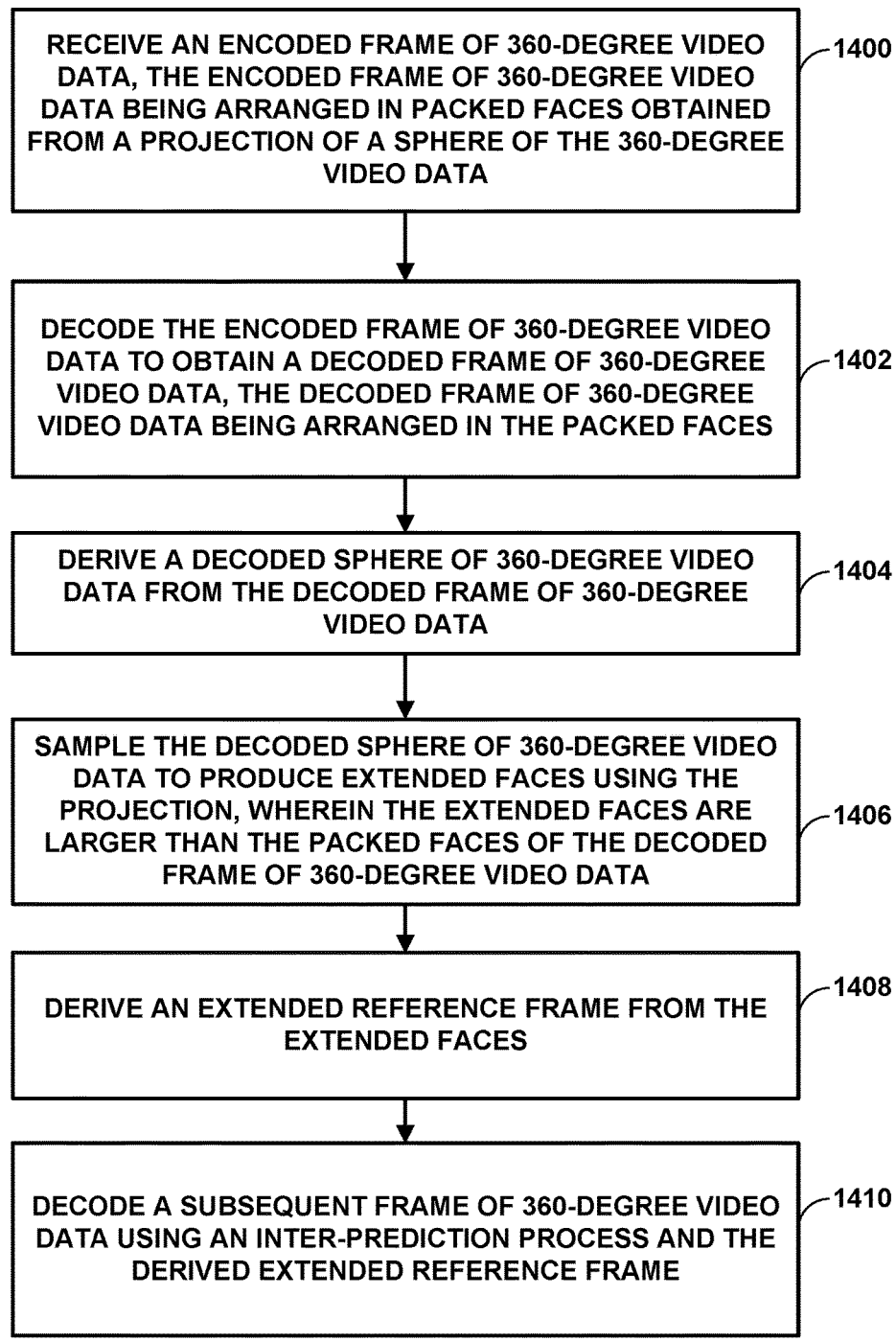
FIG. 14 is a flowchart illustrating an example decoding method of the disclosure.

FIG. 14 is a flowchart illustrating an example decoding method of the disclosure. Video decoder 30, including extended face generation unit 81, may be configured to perform the techniques of FIG. 14.

In one example of the disclosure, video decoder 30 may be configured to receive the encoded frame of 360-degree video data, the encoded frame of 360-degree video data being arranged in packed faces obtained from a projection of a sphere of the 360-degree video data (1400), and decode the frame of encoded 360-degree video data to obtain a decoded frame of 360-degree video data, the decoded frame of 360-degree video data being arranged in the packed faces (1402). Video decoder 30 may be configured to derive a decoded sphere of 360-degree video data from the decoded frame of 360-degree video data (1404), and sample the decoded sphere of 360-degree video data to produce extended faces using the projection, wherein the extended faces are larger than the packed faces of the decoded frame of 360-degree video data (1406). Video decoder 30 may be further configured to derive an extended reference frame from the extended faces (1408), and decode a subsequent encoded frame of 360-degree video data using an inter-prediction process and the derived extended reference frame (1410).

In one example, the projection is a cubemap projection or an adjusted cubemap projections (ACP).

In another example of the disclosure, to sample the decoded sphere of 360-degree video data to produce extended faces using the projection, video decoder 30 may be further configured to sample the decoded sphere of 360-degree video data to produce extended faces using the projection in accordance with a number of extension pixels.

In another example of the disclosure, video decoder 30 may be further configured to receive an indication of the number of extension pixels at a picture level or a sequence level. In one example, the number of extension pixels is equal to a largest prediction unit size in a coding tree unit (CTU) of the encoded frame of 360-degree video data. In another example of the disclosure, video decoder 30 may be further configured to rotate a current prediction unit in a current cube face of the encoded frame of 360-degree video data based on a rotation angle of a reference cube face containing a reference block for the current prediction unit.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding 360-degree video data, the method comprising:
   receiving an encoded frame of 360-degree video data, the encoded frame of 360-degree video data being arranged in packed faces obtained from a projection of a sphere of the 360-degree video data;
   decoding the frame of encoded 360-degree video data to obtain a decoded frame of 360-degree video data, the decoded frame of 360-degree video data being arranged in the packed faces;
   deriving a decoded sphere of 360-degree video data from the decoded frame of 360-degree video data;
   sampling the decoded sphere of 360-degree video data to produce extended faces using the projection, wherein the extended faces are larger than the packed faces of the decoded frame of 360-degree video data;
   deriving an extended reference frame from the extended faces; and
   decoding a subsequent encoded frame of 360-degree video data using an inter-prediction process and the derived extended reference frame.

2. The method of claim 1, wherein the projection is a cubemap projection or an adjusted cubemap projections (ACP).

3. The method of claim 1, wherein sampling the decoded sphere of 360-degree video data to produce extended faces using the projection comprises sampling the decoded sphere of 360-degree video data to produce extended faces using the projection in accordance with a number of extension pixels.

4. The method of claim 3, further comprising:
   receiving an indication of the number of extension pixels at a picture level or a sequence level.

5. The method of claim 3, wherein the number of extension pixels is equal to a largest prediction unit size in a coding tree unit (CTU) of the encoded frame of 360-degree video data.

6. The method of claim 1, wherein decoding the subsequent encoded frame of 360-degree video data using the inter-prediction process and the derived extended reference frame comprises:
   rotating a current prediction unit in a current cube face of the encoded frame of 360-degree video data based on a rotation angle of a reference cube face containing a reference block for the current prediction unit.

7. An apparatus configured to decode 360-degree video data, the apparatus comprising:
   a memory configured to store an encoded frame of 360-degree video data; and
   one or more processors in communication with the memory, the one or more processors configured to:
     receive the encoded frame of 360-degree video data, the encoded frame of 360-degree video data being arranged in packed faces obtained from a projection of a sphere of the 360-degree video data;
     decode the frame of encoded 360-degree video data to obtain a decoded frame of 360-degree video data, the decoded frame of 360-degree video data being arranged in the packed faces;
     derive a decoded sphere of 360-degree video data from the decoded frame of 360-degree video data;
     sample the decoded sphere of 360-degree video data to produce extended faces using the projection, wherein the extended faces are larger than the packed faces of the decoded frame of 360-degree video data;
     derive an extended reference frame from the extended faces; and
     decode a subsequent encoded frame of 360-degree video data using an inter-prediction process and the derived extended reference frame.

8. The apparatus of claim 7, wherein the projection is a cubemap projection or an adjusted cubemap projections (ACP).

9. The apparatus of claim 7, wherein to sample the decoded sphere of 360-degree video data to produce extended faces using the projection, the one or more processors are further configured to sample the decoded sphere of 360-degree video data to produce extended faces using the projection in accordance with a number of extension pixels.

10. The apparatus of claim 9, wherein the one or more processors are further configured to:
receive an indication of the number of extension pixels at a picture level or a sequence level.

11. The apparatus of claim 9, wherein the number of extension pixels is equal to a largest prediction unit size in a coding tree unit (CTU) of the encoded frame of 360-degree video data.

12. The apparatus of claim 7, wherein to decode the subsequent encoded frame of 360-degree video data using the inter-prediction process and the derived extended reference frame, the one or more processors are further configured to:
rotate a current prediction unit in a current cube face of the encoded frame of 360-degree video data based on a rotation angle of a reference cube face containing a reference block for the current prediction unit.

13. The apparatus of claim 7, further comprising:
a display configured to display at least a portion of the decoded sphere of 360-degree video data.

14. An apparatus configured to decode 360-degree video data, the apparatus comprising:
means for receiving an encoded frame of 360-degree video data, the encoded frame of 360-degree video data being arranged in packed faces obtained from a projection of a sphere of the 360-degree video data;
means for decoding the frame of encoded 360-degree video data to obtain a decoded frame of 360-degree video data, the decoded frame of 360-degree video data being arranged in the packed faces;
means for deriving a decoded sphere of 360-degree video data from the decoded frame of 360-degree video data;
means for sampling the decoded sphere of 360-degree video data to produce extended faces using the projection, wherein the extended faces are larger than the packed faces of the decoded frame of 360-degree video data;
means for deriving an extended reference frame from the extended faces; and
means for decoding a subsequent encoded frame of 360-degree video data using an inter-prediction process and the derived extended reference frame.

15. A computer-readable storage medium storing instructions that, when executed, causes one or more processors of a device configured to decode video data to:
receive the encoded frame of 360-degree video data, the encoded frame of 360-degree video data being arranged in packed faces obtained from a projection of a sphere of the 360-degree video data;
decode the frame of encoded 360-degree video data to obtain a decoded frame of 360-degree video data, the decoded frame of 360-degree video data being arranged in the packed faces;
derive a decoded sphere of 360-degree video data from the decoded frame of 360-degree video data;
sample the decoded sphere of 360-degree video data to produce extended faces using the projection, wherein the extended faces are larger than the packed faces of the decoded frame of 360-degree video data;
derive an extended reference frame from the extended faces; and
decode a subsequent encoded frame of 360-degree video data using an inter-prediction process and the derived extended reference frame.

16. A method of encoding 360-degree video data, the method comprising:
receiving a sphere of 360-degree video data;
arranging the sphere of 360-degree video data into a frame of packed faces obtained from a projection of the sphere of 360-degree video data;
encoding the frame of packed faces to form a frame of encoded 360-degree video data;
reconstructing the frame of encoded 360-degree video data to obtain a reconstructed frame of 360-degree video data, the reconstructed frame of 360-degree video data being arranged in the packed faces;
deriving a reconstructed sphere of 360-degree video data from the reconstructed frame of 360-degree video data;
sampling the reconstructed sphere of 360-degree video data to produce extended faces using the projection, wherein the extended faces are larger than the packed faces of the reconstructed frame of 360-degree video data;
deriving an extended reference frame from the extended faces; and
encoding a subsequent frame of 360-degree video data using an inter-prediction process and the derived extended reference frame.

17. The method of claim 16, wherein the projection is a cubemap projection or an adjusted cubemap projections (ACP).

18. The method of claim 16, wherein sampling the reconstructed sphere of 360-degree video data to produce extended faces using the projection comprises sampling the reconstructed sphere of 360-degree video data to produce extended faces using the projection in accordance with a number of extension pixels.

19. The method of claim 18, further comprising:
generating an indication of the number of extension pixels at a picture level or a sequence level.

20. The method of claim 18, wherein the number of extension pixels is equal to a largest prediction unit size in a coding tree unit (CTU) of the frame of packed faces.

21. The method of claim 16, wherein encoding the subsequent frame of 360-degree video data using the inter-prediction process and the derived extended reference frame comprises:
rotating a current prediction unit in a current cube face of the frame of packed faces based on a rotation angle of a reference cube face containing a reference block for the current prediction unit.

22. An apparatus configured to encode 360-degree video data, the apparatus comprising:
a memory configured to store a sphere of 360-degree video data; and
one or more processors in communication with the memory, the one or more processors configured to:
receive the sphere of 360-degree video data;
arrange the sphere of 360-degree video data into a frame of packed faces obtained from a projection of the sphere of 360-degree video data;
encode the frame of packed faces to form a frame of encoded 360-degree video data;
reconstruct the frame of encoded 360-degree video data to obtain a reconstructed frame of 360-degree video data, the reconstructed frame of 360-degree video data being arranged in the packed faces;

derive a reconstructed sphere of 360-degree video data from the reconstructed frame of 360-degree video data;

sample the reconstructed sphere of 360-degree video data to produce extended faces using the projection, wherein the extended faces are larger than the packed faces of the reconstructed frame of 360-degree video data;

derive an extended reference frame from the extended faces; and encode a subsequent frame of 360-degree video data using an inter-prediction process and the derived extended reference frame.

23. The apparatus of claim 22, wherein the projection is a cubemap projection or an adjusted cubemap projections (ACP).

24. The apparatus of claim 22, wherein to sample the reconstructed sphere of 360-degree video data to produce extended faces using the projection, the one or more processors are further configured to sample the reconstructed sphere of 360-degree video data to produce extended faces using the projection in accordance with a number of extension pixels.

25. The apparatus of claim 24, wherein the one or more processors are further configured to:

generate an indication of the number of extension pixels at a picture level or a sequence level.

26. The apparatus of claim 24, wherein the number of extension pixels is equal to a largest prediction unit size in a coding tree unit (CTU) of the encoded frame of packed faces.

27. The apparatus of claim 22, wherein to encode the subsequent frame of 360-degree video data using the inter-prediction process and the derived extended reference frame, the one or more processors are further configured to:

rotate a current prediction unit in a current cube face of the encoded frame of packed faces based on a rotation angle of a reference cube face containing a reference block for the current prediction unit.

28. The apparatus of claim 22, further comprising:

a camera configured to capture the sphere of 360-degree video data.

29. An apparatus configured to encode 360-degree video data, the apparatus comprising:

means for receiving a sphere of 360-degree video data;

means for arranging the sphere of 360-degree video data into a frame of packed faces obtained from a projection of the sphere of 360-degree video data;

means for encoding the frame of packed faces to form a frame of encoded 360-degree video data;

means for reconstructing the frame of encoded 360-degree video data to obtain a reconstructed frame of 360-degree video data, the reconstructed frame of 360-degree video data being arranged in the packed faces;

means for deriving a reconstructed sphere of 360-degree video data from the reconstructed frame of 360-degree video data;

means for sampling the reconstructed sphere of 360-degree video data to produce extended faces using the projection, wherein the extended faces are larger than the packed faces of the reconstructed frame of 360-degree video data;

means for deriving an extended reference frame from the extended faces; and means for encoding a subsequent frame of 360-degree video data using an inter-prediction process and the derived extended reference frame.

30. A computer-readable storage medium storing instructions that, when executed, causes one or more processors of a device configured to encode video data to:

receive a sphere of 360-degree video data;

arrange the sphere of 360-degree video data into a frame of packed faces obtained from a projection of the sphere of 360-degree video data;

encode the frame of packed faces to form a frame of encoded 360-degree video data;

reconstruct the frame of encoded 360-degree video data to obtain a reconstructed frame of 360-degree video data, the reconstructed frame of 360-degree video data being arranged in the packed faces;

derive a reconstructed sphere of 360-degree video data from the reconstructed frame of 360-degree video data;

sample the reconstructed sphere of 360-degree video data to produce extended faces using the projection, wherein the extended faces are larger than the packed faces of the reconstructed frame of 360-degree video data;

derive an extended reference frame from the extended faces; and encode a subsequent frame of 360-degree video data using an inter-prediction process and the derived extended reference frame.

* * * * *